(12) United States Patent
Gaudin et al.

(10) Patent No.: US 11,829,978 B2
(45) Date of Patent: Nov. 28, 2023

(54) CONNECTED CAR AS A PAYMENT DEVICE

(71) Applicant: STATE FARM MUTUAL AUTOMOBILE INSURANCE COMPANY, Bloomington, IL (US)

(72) Inventors: Kristopher Keith Gaudin, Bloomington, IL (US); Leo Nelson Chan, Normal, IL (US); Justin Davis, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 17/876,512

(22) Filed: Jul. 28, 2022

(65) Prior Publication Data

US 2022/0366397 A1  Nov. 17, 2022

Related U.S. Application Data

(63) Continuation of application No. 17/013,063, filed on Sep. 4, 2020, now Pat. No. 11,436,589, which is a
(Continued)

(51) Int. Cl.
*G06Q 20/20* (2012.01)
*G06Q 50/06* (2012.01)
(Continued)

(52) U.S. Cl.
CPC ............ *G06Q 20/204* (2013.01); *B60W 60/00* (2020.02); *G06Q 20/20* (2013.01); *G06Q 20/202* (2013.01);
(Continued)

(58) Field of Classification Search
None
See application file for complete search history.

(56) References Cited

U.S. PATENT DOCUMENTS 6,222,463 B1    4/2001   Rai
6,237,647 B1 *  5/2001   Pong .................... B67D 7/348
                                                   141/94
(Continued)

FOREIGN PATENT DOCUMENTS

DE      102014114438 A1   4/2015
WO      WO-2015/016929 A1  2/2015
WO      WO-2016/127290 A1  8/2016

OTHER PUBLICATIONS

"System for Automated Vehicle Fueling and Tracking," An Ip.com Prior Art Database Technical Disclosure, https://ip.com/IPCOM/000239175 (Oct. 20, 2014). (Year: 2014).*

(Continued)

*Primary Examiner* — Elizabeth H Rosen
(74) *Attorney, Agent, or Firm* — MARSHALL, GERSTEIN & BORUN LLP

(57) ABSTRACT

Methods, systems, apparatus, and non-transitory computer readable media are described for using a vehicle as a payment device. Various aspects may include receiving a selection of a stored financial card or financial account at a vehicle head unit. The selected financial card or financial account may be transmitted to a point-of-sale (POS) terminal for making a payment by transmitting a tokenized card number to the POS terminal. The tokenized card number may be transmitted over a very short-range communication link to ensure that the transmission is secure. For example, electronic circuitry may be attached to the exterior of the vehicle, where the electronic circuitry may be within a threshold distance (e.g. one inch, three inches, six inches, one foot, three feet, etc.) of the POS terminal. The tokenized card number may be transmitted from the vehicle head unit to the electronic circuitry and then to the POS terminal.

14 Claims, 13 Drawing Sheets

Related U.S. Application Data continuation of application No. 15/428,636, filed on Feb. 9, 2017, now Pat. No. 10,803,440.

(60) Provisional application No. 62/362,148, filed on Jul. 14, 2016, provisional application No. 62/360,008, filed on Jul. 8, 2016, provisional application No. 62/295,596, filed on Feb. 16, 2016.

(51) Int. Cl.
    *G06Q 20/40*     (2012.01)
    *G07C 9/25*     (2020.01)
    *G06Q 20/32*     (2012.01)
    *G07F 15/00*     (2006.01)
    *B60W 60/00*     (2020.01)
    *G06Q 30/06*     (2023.01)
    *G07C 9/26*     (2020.01)

(52) U.S. Cl.
    CPC ....... *G06Q 20/206* (2013.01); *G06Q 20/3226* (2013.01); *G06Q 20/3278* (2013.01); *G06Q 20/405* (2013.01); *G06Q 20/40145* (2013.01); *G06Q 30/06* (2013.01); *G06Q 50/06* (2013.01); *G07C 9/257* (2020.01); *G07F 15/001* (2013.01); *G07C 9/26* (2020.01)

(56) References Cited

U.S. PATENT DOCUMENTS

| | | | |
|---|---|---|---|
| 6,338,008 B1 | 1/2002 | Kohut et al. | |
| 6,382,269 B1 | 5/2002 | Tatsuno | |
| 6,390,151 B1 * | 5/2002 | Christman | G06Q 50/06 705/413 |
| 6,505,106 B1 | 1/2003 | Lawrence et al. | |
| 6,574,603 B1 | 6/2003 | Dickson et al. | |
| 6,751,475 B1 | 6/2004 | Holmes et al. | |
| 6,856,820 B1 | 2/2005 | Kolls | |
| 6,894,601 B1 | 5/2005 | Grunden et al. | |
| 7,071,842 B1 | 7/2006 | Brady, Jr. | |
| 7,155,322 B2 | 12/2006 | Nakahara et al. | |
| 7,249,039 B2 | 7/2007 | Yoshioka et al. | |
| 7,970,644 B2 | 6/2011 | Hedley et al. | |
| 8,025,226 B1 | 9/2011 | Hopkins, III et al. | |
| 8,370,254 B1 | 2/2013 | Hopkins, III et al. | |
| 8,407,144 B2 | 3/2013 | Roberts et al. | |
| 8,417,598 B2 | 4/2013 | Pinkusevich et al. | |
| 8,433,471 B2 | 4/2013 | Christensen | |
| 8,880,270 B1 | 11/2014 | Ferguson et al. | |
| 9,080,529 B1 | 7/2015 | Klughart | |
| 9,311,271 B2 | 4/2016 | Wright | |
| 9,392,743 B2 | 7/2016 | Camacho-Cook et al. | |
| 9,633,487 B2 | 4/2017 | Wright | |
| 9,706,354 B2 * | 7/2017 | Enriquez | H04W 12/068 |
| 10,192,369 B2 | 1/2019 | Wright | |
| 10,198,879 B2 | 2/2019 | Wright | |
| 10,467,623 B2 | 11/2019 | Purves et al. | |
| 10,504,094 B1 | 12/2019 | Gaudin et al. | |
| 10,803,440 B1 | 10/2020 | Gaudin et al. | |
| 10,810,572 B1 | 10/2020 | Gaudin et al. | |
| 10,949,827 B1 | 3/2021 | Gaudin et al. | |
| 10,949,830 B1 | 3/2021 | Gaudin et al. | |
| 10,949,831 B1 | 3/2021 | Gaudin et al. | |
| 11,328,284 B1 | 5/2022 | Gaudin et al. | |
| 11,436,589 B1 | 9/2022 | Gaudin et al. | |
| 11,556,913 B1 | 1/2023 | Gaudin et al. | |
| 11,580,515 B1 | 2/2023 | Gaudin et al. | |
| 11,631,071 B2 | 4/2023 | Gaudin et al. | |
| 11,694,184 B2 | 7/2023 | Gaudin et al. | |
| 11,694,185 B2 | 7/2023 | Gaudin et al. | |
| 11,699,142 B1 | 7/2023 | Gaudin et al. | |
| 2002/0016655 A1 | 2/2002 | Joao | |
| 2002/0032506 A1 | 3/2002 | Tokitsu et al. | |
| 2002/0097178 A1 | 7/2002 | Thomas et al. | |
| 2002/0101363 A1 | 8/2002 | Ogura et al. | |
| 2002/0190118 A1 | 12/2002 | Davenport et al. | |
| 2003/0050095 A1 | 3/2003 | Chen et al. | |
| 2003/0069673 A1 | 4/2003 | Hong et al. | |
| 2003/0069784 A1 | 4/2003 | Banerjee et al. | |
| 2004/0036584 A1 | 2/2004 | Briick | |
| 2005/0033694 A1 | 2/2005 | Perrin | |
| 2005/0102075 A1 | 5/2005 | Dar et al. | |
| 2005/0125669 A1 | 6/2005 | Stewart et al. | |
| 2005/0203673 A1 | 9/2005 | El-Hajj et al. | |
| 2006/0032547 A1 | 2/2006 | Rossi | |
| 2007/0061069 A1 | 3/2007 | Christensen | |
| 2007/0225912 A1 | 9/2007 | Grush | |
| 2008/0040210 A1 | 2/2008 | Hedley | |
| 2008/0208656 A1 | 8/2008 | Matsubara | |
| 2008/0208680 A1 | 8/2008 | Cho | |
| 2009/0024525 A1 | 1/2009 | Blumer et al. | |
| 2009/0157566 A1 | 6/2009 | Grush | |
| 2009/0289113 A1 | 11/2009 | Vilnai et al. | |
| 2010/0030461 A1 | 2/2010 | Maekawa et al. | |
| 2010/0057624 A1 | 3/2010 | Hurt et al. | |
| 2010/0073124 A1 | 3/2010 | Mahalingaiah et al. | |
| 2010/0076878 A1 | 3/2010 | Burr et al. | |
| 2010/0088127 A1 | 4/2010 | Betancourt et al. | |
| 2010/0114616 A1 | 5/2010 | Touati | |
| 2010/0115093 A1 | 5/2010 | Rice | |
| 2010/0115505 A1 | 5/2010 | Touati et al. | |
| 2010/0161481 A1 | 6/2010 | Littrell | |
| 2010/0228608 A1 | 9/2010 | Hedley et al. | |
| 2010/0273543 A1 | 10/2010 | Weitzhandler et al. | |
| 2010/0280956 A1 | 11/2010 | Chutorash et al. | |
| 2010/0287038 A1 | 11/2010 | Copejans | |
| 2010/0325049 A1 | 12/2010 | Tanaka | |
| 2010/0332363 A1 | 12/2010 | Duddle et al. | |
| 2011/0035049 A1 | 2/2011 | Barrett | |
| 2011/0133952 A1 | 6/2011 | McNamara et al. | |
| 2011/0215897 A1 | 9/2011 | Simpson et al. | |
| 2011/0231310 A1 | 9/2011 | Roberts et al. | |
| 2011/0237186 A1 | 9/2011 | Preissinger et al. | |
| 2011/0288721 A1 | 11/2011 | Christensen et al. | |
| 2012/0109797 A1 | 5/2012 | Shelton et al. | |
| 2012/0172010 A1 | 7/2012 | Oman et al. | |
| 2012/0191524 A1 | 7/2012 | Ambrosio et al. | |
| 2012/0209566 A1 | 8/2012 | Idiart | |
| 2012/0209579 A1 | 8/2012 | Fansler et al. | |
| 2012/0323771 A1 | 12/2012 | Michael | |
| 2013/0065576 A1 | 3/2013 | Basir | |
| 2013/0085928 A1 | 4/2013 | McKinney | |
| 2013/0103585 A1 | 4/2013 | Carapelli | |
| 2013/0132286 A1 | 5/2013 | Schaefer et al. | |
| 2013/0138460 A1 | 5/2013 | Schumann, Jr. et al. | |
| 2013/0246171 A1 * | 9/2013 | Carapelli | G06Q 20/325 705/14.51 |
| 2013/0262275 A1 | 10/2013 | Outwater et al. | |
| 2013/0300582 A1 | 11/2013 | McNamara et al. | |
| 2014/0019170 A1 | 1/2014 | Coleman et al. | |
| 2014/0058805 A1 | 2/2014 | Paesler et al. | |
| 2014/0068713 A1 | 3/2014 | Nicholson et al. | |
| 2014/0136329 A1 | 5/2014 | Chang | |
| 2014/0195047 A1 | 7/2014 | King et al. | |
| 2014/0244504 A1 * | 8/2014 | Owen | G06Q 20/06 705/44 |
| 2014/0305545 A1 | 10/2014 | Butler, Jr. | |
| 2014/0322676 A1 | 10/2014 | Raman | |
| 2015/0058224 A1 * | 2/2015 | Gaddam | G06Q 20/327 705/44 |
| 2015/0143116 A1 | 5/2015 | Tang et al. | |
| 2015/0161590 A1 | 6/2015 | Genovez | |
| 2015/0168172 A1 | 6/2015 | Roth et al. | |
| 2015/0220916 A1 | 8/2015 | Prakash et al. | |
| 2015/0231968 A1 | 8/2015 | Dunger et al. | |
| 2015/0242855 A1 | 8/2015 | Vilnai | |
| 2015/0242969 A1 | 8/2015 | Pallas et al. | |
| 2015/0278788 A1 | 10/2015 | Manuel et al. | |
| 2015/0317842 A1 | 11/2015 | Evans | |
| 2015/0348335 A1 | 12/2015 | Ramanujam | |
| 2015/0356665 A1 | 12/2015 | Colson et al. | |
| 2016/0035001 A1 | 2/2016 | Driscoll et al. | |
| 2016/0035013 A1 | 2/2016 | Plattenburg et al. | |

(56) References Cited

U.S. PATENT DOCUMENTS

| | | | |
|---|---|---|---|
| 2016/0035153 A1* | 2/2016 | Lesesky | G07C 5/085 701/115 |
| 2016/0110796 A1 | 4/2016 | Chang et al. | |
| 2016/0139600 A1* | 5/2016 | Delp | B60K 37/06 701/26 |
| 2016/0162957 A1 | 6/2016 | Jauregui Mercado | |
| 2016/0307185 A1 | 10/2016 | Betancourt | |
| 2016/0350726 A1 | 12/2016 | Lee et al. | |
| 2017/0073211 A1 | 3/2017 | Wilson et al. | |
| 2017/0076290 A1 | 3/2017 | Corfitsen | |
| 2017/0116600 A1 | 4/2017 | Sharan | |
| 2017/0127230 A1 | 5/2017 | Enriquez et al. | |
| 2017/0221116 A1 | 8/2017 | Makke et al. | |
| 2018/0018664 A1 | 1/2018 | Purves et al. | |
| 2020/0079320 A1 | 3/2020 | Lacoss-Arnold | |

OTHER PUBLICATIONS

"Method and System for Smarter Routing of a Vehicle to a Fuel Station based on Vehicle Needs and Price Negotiation," An IP.com Prior Art Database Technical Disclosure, https://ip.com/IPCOM/000238196 (Aug. 7, 2014). (Year: 2014).*

Mainetti et al., A Smart Parking System based on IoT protocols and emerging enabling technologies, 2015 IEEE 2nd World Forum on Internet of Things (WF-IoT), Milan, 2015, pp. 764-769, doi: 10.1109/WF-IoT .2015.7389150. (Year: 2015).

Newcomb, Doug. "Forget self-Driving, How About Self-Fueling Cars?" https://www.pcmag.com/opinions/forget-self-driving-how-about-self-fueling-cars (Feb. 6, 2015). (Year: 2015).

Read, The Robots are Coming (To Pump Your Gas), The Car connection, Jan. 30, 2014.

Thorsen, Robogas? Pacific Company's Robotic Fuel Pump Fills the Tank While You Sit in Your Car, St. Louis Post-Dispatch, Jan. 23, 2014.

U.S. Appl. No. 15/428,629, filed Feb. 9, 2017.
U.S. Appl. No. 15/428,629, Nonfinal Office Action, dated Mar. 22, 2019.
U.S. Appl. No. 15/428,629, Notice of Allowance, dated Jul. 31, 2019.
U.S. Appl. No. 15/428,636, filed Feb. 9, 2017.
U.S. Appl. No. 15/428,636, Final Office Action, dated Jun. 27, 2019.
U.S. Appl. No. 15/428,636, Nonfinal Office Action, dated Nov. 29, 2018.
U.S. Appl. No. 15/428,636, Nonfinal Office Action, dated Oct. 18, 2019.
U.S. Appl. No. 15/428,636, Notice of Allowance, dated Jul. 28, 2020.
U.S. Appl. No. 15/428,646, filed Feb. 9, 2017.
U.S. Appl. No. 15/428,646, Nonfinal Office Action, dated Sep. 6, 2019.
U.S. Appl. No. 15/428,646, Notice of Allowance, dated Jul. 29, 2020.
U.S. Appl. No. 15/428,656, filed Feb. 9, 2017.
U.S. Appl. No. 15/428,656, Final Office Action, dated Sep. 3, 2020.
U.S. Appl. No. 15/428,656, Nonfinal Office Action, Oct. 31, 2019.
U.S. Appl. No. 15/428,656, Notice of Allowance, dated Jan. 14, 2021.
U.S. Appl. No. 15/428,667, Final Office Action, dated Sep. 3, 2020.
U.S. Appl. No. 15/428,667, Nonfinal Office Action, dated Sep. 18, 2019.
U.S. Appl. No. 15/428,667, Notice of Allowance, dated Jan. 13, 2021.
U.S. Appl. No. 16/670,259, Gaudin et al., "Connected Car as a Payment Device", filed Oct. 31, 2019.
U.S. Appl. No. 16/670,259, Nonfinal Office Action, dated Oct. 29, 2020.
U.S. Appl. No. 16/670,259, Notice of Allowance, dated Jan. 12, 2021.
U.S. Appl. No. 17/013,063, Final Office Action, dated Nov. 26, 2021.
U.S. Appl. No. 17/013,063, Nonfinal Office Action, dated Jun. 15, 2021.
U.S. Appl. No. 17/013,063, Notices of Allowance, dated Jun. 10, 2022 and dated Jun. 23, 2022.
U.S. Appl. No. 17/013,081, Nonfinal Office Action, dated Jun. 15, 2021.
U.S. Appl. No. 17/013,081, Notice of Allowance, dated Jan. 6, 2022.
U.S. Appl. No. 17/167,994, Nonfinal Office Action, dated Jun. 10, 2022.
U.S. Appl. No. 17/714,989, Gaudin et al., Connected Car as a Payment Device, filed Apr. 6, 2022.
U.S. Appl. No. 17/168,001, Gaudin et al., Merchant Terminal for Receiving Payment from a Vehicle, filed Feb. 4, 2021.
"Merchant News: McDonald's Tests Mobil's Speedpass to Speed Up Customer Waiting Times", American Banker, 3 pp. (Dec. 2, 2000).
"Refuelling a Vehicle Using a Refill Robot", 3 pp. downloaded from the Internet at: <https://ip.com/IPCOM/000233195> (2013).
Lu et al., Connected vehicles: solutions and challenges, IEEE Internet of Things Journal, 1(4):289-99 (Aug. 2014).
U.S. Appl. No. 17/167,994, Notice of Allowance, dated Sep. 21, 2022.
U.S. Appl. No. 17/168,001, Non-final Office Action, dated Sep. 29, 2022.
U.S. Appl. No. 17/168,013, Notice of Allowance, dated Oct. 6, 2022.
U.S. Appl. No. 17/714,989, Notice of Allowance, dated Dec. 27, 2022.
U.S. Appl. No. 17/947,344, Nonfinal Office Action, dated Feb. 15, 2023.
Steffen et al., Near Field Communication (NFC) in an Automotive Environment, Second International Workshop on Near Field Communication, IEEE (2010).
U.S. Appl. No. 17/168,001, Notice of Allowance, dated Feb. 23, 2023.
U.S. Appl. No. 17/947,344, Notice of Allowance, dated Apr. 5, 2023.
U.S. Appl. No. 17/947,344, Office Action, dated Feb. 15, 2023.
U.S. Appl. No. 18/079,360, Notice of Allowance, dated Mar. 29, 2023.

* cited by examiner

CONNECTED CAR AS A PAYMENT DEVICE

CROSS-REFERENCE TO RELATED APPLICATIONS

This application is a continuation of U.S. patent application Ser. No. 17/013,063 entitled "Connected Car as a Payment Device," filed on Sep. 4, 2020, which is a continuation of U.S. patent application Ser. No. 15/428,636 entitled "Connected Car as a Payment Device," filed on Feb. 9, 2017, which claims priority to and the benefit of the filing date of (1) provisional U.S. Patent Application No. 62/295,596 entitled "Connected Car as a Payment Device," filed on Feb. 16, 2016, (2) provisional U.S. Patent Application No. 62/360,008 entitled "Connected Car as a Payment Device," filed on Jul. 8, 2016, and (3) provisional U.S. Patent Application No. 62/362,148 entitled "Connected Car as a Payment Device," filed on Jul. 14, 2016, the entire contents of each of which is hereby expressly incorporated herein by reference.

TECHNICAL FIELD

The present disclosure generally relates to systems, methods, apparatus, and non-transitory computer readable media for using a vehicle as a payment device and, more particularly to completing a financial transaction by communicating from a vehicle to a point-of-sale (POS) terminal.

BACKGROUND

Today, vehicle occupants pay for several goods and services while the vehicle occupants are inside or near their vehicles, such as food, fuel, a car wash, etc. Typically, the transaction takes place by swiping a financial card such as a credit or debit card at a POS terminal or by providing cash or the financial card to an employee of the establishment which provides the goods or services. However, this requires a vehicle occupant to constantly carry cash and/or financial cards when making purchases, get out of her vehicle to make payments, and/or exchange cash or a financial card with an employee, which may be a time-consuming process.

BRIEF SUMMARY

The present embodiments may relate to using a vehicle as a payment device, so that users may remain inside their vehicles when making payments for goods and services, such as food, fuel, a car wash, etc. An application may be stored within an infotainment system (also referred to herein as a "vehicle head unit") of a vehicle which stores data representing financial cards for making payments. To retrieve one of the stored financial cards for making a payment at a drive-thru, fuel station, etc., the user may select an indication of a financial card at the infotainment system.

In response to the user's selection, the infotainment system may transmit the selected data over a short-range communication link to a POS terminal (also referred to herein as a "merchant communication terminal") at the drive-thru, fuel station, etc. The POS terminal may then process the payment using the transmitted data and/or transmit an electronic receipt to be displayed on the infotainment system. In some embodiments, for additional security and/or to establish a communication link between the infotainment system and the POS terminal, electronic circuitry may be proximately attached to the exterior of the vehicle, such as at or near the fuel tank cap (also referred to herein as a "fuel cap"). The electronic circuitry may receive the selected data from the infotainment system over a first short-range communication link, and/or transmit the received data to the POS terminal over a second very short-range communication link.

In one aspect, a computer-implemented method of using a connected vehicle as an electronic payment device may be provided. The method may include: (1) obtaining (via one or more processors and/or associated transceivers) identification information for a user within a vehicle or for the vehicle; authenticating (via the one or more processors and/or associated transceivers) the user or the vehicle based upon the identification information to ensure the user or the vehicle is authorized to use a virtual account for purchasing goods or services; and/or (3) detecting (via the one or more processors and/or transceivers) a triggering event indicating that the vehicle is within a predetermined range for communicating with a merchant communication terminal of a merchant. The method may further include (4) presenting (via the one or more processors) a display including an indication of goods or services that can be purchased at the merchant communication terminal and a user control for transmitting a request to order the goods or services to the merchant communication terminal; and/or in response to receiving a selection of the user control: (5) transmitting (via the one or more processors and/or associated transceivers, and/or a wired or wireless communication and/or data transmission over a radio link or wireless communication channel) the request to order the goods or services to the merchant communication terminal; and/or (6) securely transferring (via the one or more processors and/or a wired or wireless communication and/or data transmission over a radio link or wireless communication channel) funds from the virtual account to a virtual account of the merchant to facilitate secure vehicle payment of goods and services. The method may include additional, fewer, or alternative actions, including those discussed elsewhere herein.

In another aspect, a computer system configured to use a connected vehicle as an electronic payment device may be provided. The computer system may include one or more processors, transceivers, and/or sensors configured to: (1) obtain identification information for a user within a vehicle or for the vehicle; (2) authenticate the user or the vehicle based upon the identification information to ensure the user or the vehicle is authorized to use a virtual account for purchasing goods or services; and/or (3) detect a triggering event indicating that the vehicle is within a predetermined range for communicating with a merchant communication terminal of a merchant. The computer system may be further configured to: (4) present a display including an indication of goods or services that can be purchased at the merchant communication terminal and a user control for transmitting a request to order the goods or services to the merchant communication terminal; and/or in response to receiving a selection of the user control: (5) transmit the request to order the goods or services to the merchant communication terminal; and/or (6) securely transfer, via a short-range communication link, funds from the virtual account to a virtual account of the merchant to facilitate secure vehicle payment of goods and services. The computer system may include additional, fewer, or alternate components and/or functionality, including that may be discussed elsewhere herein.

In yet another aspect, a non-transitory computer-readable medium may be provided. The non-transitory computer-readable medium may store a set of instructions, that when executed on one or more processors in a head unit of a vehicle, may cause the one or more processors to: (1) obtain identification information for a user within a vehicle or for the vehicle; (2) authenticate the user or the vehicle based upon the identification information to ensure the user or the vehicle is authorized to use a virtual account for purchasing goods or services; and/or (3) detect a triggering event indicating that the vehicle is within a predetermined range for communicating with a merchant communication terminal of a merchant. The set of instructions may further cause the one or more processors to: (4) present a display including an indication of goods or services that can be purchased at the merchant communication terminal and a user control for transmitting a request to order the goods or services to the merchant communication terminal; and/or in response to receiving a selection of the user control: (5) transmit the request to order the goods or services to the merchant communication terminal; and/or (6) securely transfer, via a short-range communication link, funds from the virtual account to a virtual account of the merchant to facilitate secure vehicle payment of goods and services. The non-transitory computer-readable medium may include additional, fewer, or alternate components and/or functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
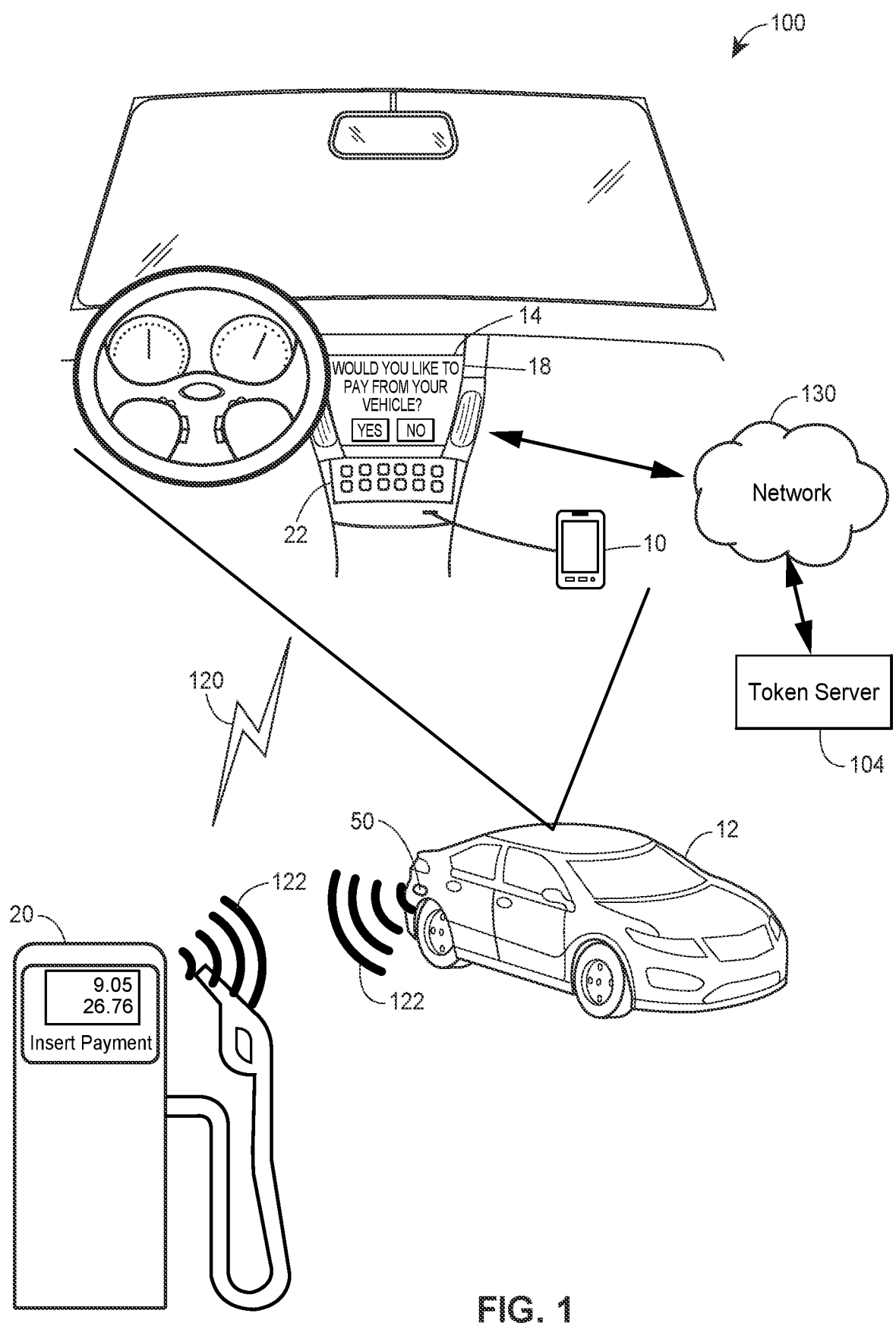
FIG. 1 illustrates a block diagram of an exemplary environment on which an exemplary vehicle payment system may operate in accordance with an exemplary aspect of the present disclosure.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

To utilize a vehicle as a payment device, a vehicle payment application may be included in a vehicle head unit. The vehicle payment application may store one or more financial cards or any other financial accounts (also referred to herein as a "virtual account") of a user, which may be retrieved for making payments from the vehicle. The financial cards or financial accounts may be received at the vehicle payment application by, for example, scanning an image of the financial card at the vehicle head unit, entering data for the financial card or financial account (also referred to herein as "virtual account information") such as a cardholder name, card issuer, card number, card expiration date, etc., and/or transferring data for the financial card or financial account from a mobile device such as a smart-phone, wearable device, laptop computer, tablet, etc.

In some embodiments, the vehicle payment application may generate a token representing the financial data for the financial card (also referred to herein as a "tokenized card number") and/or may store the token rather than the financial data to reduce the risk of a security breach. The financial data may include a cardholder name, a card number, a card expiration date, a card security code (CSC), and/or a card type (e.g., VISA®, MasterCard®, American Express®, Discover®, etc.). In some embodiments, the financial data may also include additional information associated with the financial card such as a billing address.

Also in some embodiments, the financial data may be transmitted to a third-party token server which may generate and/or transmit the token to the vehicle head unit. The third-party token server may store the token with the corresponding financial data for the financial card. When the payment is processed, the issuing bank may communicate with the third-party token server to retrieve the financial data corresponding to the token, for example. In yet other embodiments, the third-party token server may be the issuing bank.

In any event, when a user wants to make a purchase from the vehicle, the user may select a user control requesting to make a payment from the vehicle. The vehicle payment application may then authenticate the user to ensure that the user is authorized to make payments with the stored financial cards or financial accounts. For example, the user may be authenticated by receiving biometric information from the user such as a fingerprint, an image of the user's face or eyes, etc., and comparing the biometric information to stored biometric information for authorized users. In other embodiments, the user may be authenticated by entering a username and/or password. In any event, when the user is authenticated, the user may select an indication of one of the stored financial cards at the vehicle head unit via the vehicle payment application. An indication of a financial card may be an image representing the financial card including the shape of the financial card, the background color/image of the financial card, the name of the issuer of the financial card (also referred to herein as an "issuing bank"), the card type, and/or masked financial data.

A token representing financial data for the selected financial card may then be transmitted to a POS terminal at the establishment where the user is making the purchase. For example, the token may be transmitted to the POS terminal via a short-range communication link, such as Bluetooth, Universal Serial Bus (USB), Dedicated Short-Range Communications (DSRC), Radio-Frequency Identification (RFID), etc. In some embodiments, the vehicle payment system may include electronic circuitry (also referred to herein as an "electronic device") proximately attached to the exterior of the vehicle, such as a door panel, fuel cap, etc. In such embodiments, the vehicle head unit may communicate with the electronic circuitry via a first short-range communication link such as Bluetooth, for example. The electronic circuitry may in turn communicate with the POS terminal, via a second very short-range communication link such as Near Field Communication (NFC), high frequency (HF) RFID, etc.

A short-range communication link may be a communication link between devices where data is transmitted via a wired and/or wireless connection within a first threshold distance (e.g. 30 feet, 50 feet, 100 feet, 200 feet, etc.). For example, a short-range communication link may include Bluetooth, DSRC, RFID, Wi-Fi, USB, etc. A very short-range communication link may be a communication link between devices where data is transmitted via a wired and/or wireless connection within a second threshold distance which is less than the first threshold distance (e.g., one inch, three inches, six inches, a foot, three feet, etc.). For example, a very short-range communication link may include NFC, HF RFID, etc. In some scenarios, very short-range communication links may also be short-range communication links.

For example, the vehicle head unit and the electronic circuitry may be paired together via a Bluetooth pairing. When the user requests to make a payment from the vehicle and selects a stored financial card or financial account, the vehicle head unit may transmit an indication to the electronic circuitry to transmit the token representing the financial data for the selected financial card. In turn, the electronic circuitry may transmit the token over the second very short-range communication link to the POS terminal.

The electronic circuitry proximately attached to the exterior of the vehicle may be in very close proximity to the POS terminal (e.g. within one inch, three inches, six inches, a foot, three feet, etc.). By utilizing the electronic circuitry as an intermediary between the vehicle head unit and the POS terminal, the present embodiments advantageously allow for secure transmission of the token representing financial data. For example, by transmitting the token between devices which are within a few inches or feet of each other via a very short-range communication link, it becomes very difficult for eavesdroppers to intercept the signal. In this manner, the transmission may be secure while allowing the user to add and/or select financial cards, authorize payments, and/or view electronic receipts on the display of the vehicle head unit.

Additionally, in some embodiments, the token may be transmitted from the vehicle head unit to the electronic circuitry once, when a new financial card or financial account is added. Subsequently, when the user authorizes payment for a selected financial card or financial account, an indication of the financial card or financial account may be transmitted to the electronic circuitry, which may in turn retrieve and/or transmit the token to the POS terminal. Accordingly, the present embodiments create additional security for the transmission of a token representing financial data, because the token is only transmitted from the vehicle head unit to the electronic circuitry once. After the initial transmission, all subsequent transmissions may be over very short distances, as mentioned above, making it difficult for eavesdroppers to intercept the signal.

In addition to transmitting payments from a vehicle in a secure manner, the present embodiments advantageously allow for further automation of the retail process. For example, as described in more detail below, a vehicle at a fuel station may automatically transmit payment, open a fuel cap for receiving the fuel and interact with a smart fuel pump having a robotic arm to maneuver the nozzle and fill the vehicle with fuel. In this manner, autonomous vehicles may travel to the fuel station, receive fuel and make a payment without any human intervention.

Generally speaking, the techniques for utilizing a vehicle as a payment device may be implemented in one or more network servers, in one or more client devices, in a vehicle head unit, in electronic circuitry attached to the exterior of the vehicle, or a system that includes several of these devices. However, for clarity, the examples below focus primarily on an embodiment in which financial data for a financial card is received at a vehicle head unit. The vehicle head unit may transmit the financial data to a third-party token server which may generate and/or transmit a token representing the financial data to the vehicle head unit. When a user selects the financial card for making a payment, the vehicle head unit may transmit the token representing financial data for the selected financial card to electronic circuitry attached to the exterior of the vehicle. The electronic circuitry may then transmit the token to the POS terminal for processing the payment. In other embodiments, the vehicle head unit may communicate directly with the POS terminal.

I. Exemplary Environment for Vehicle Payment Device

FIG. 1 illustrates various aspects of an exemplary environment implementing a vehicle payment system 100. The environment 100 may include a vehicle head unit 14 within a vehicle 12, a portable device 10 within the vehicle 12, electronic circuitry 50 proximately attached to the exterior of the vehicle, a third-party token server 104, and/or a POS terminal 20 which may be communicatively connected through one or more short-range and/or very short-range communication links 120, 122 and/or a network 130, as described below.

The vehicle 12 may be operated by a human, such as a user or may be an autonomous and/or semi-autonomous vehicle. An autonomous vehicle may be a vehicle including one or more automated operation features capable of operating the vehicle in the absence of or without operating input from a vehicle operator. A semi-autonomous vehicle may be a vehicle with one or more automated operation features capable of operating the vehicle without operating input from a vehicle operator and one or more manual operation features that require operating input from a vehicle operator.

According to some embodiments, the vehicle head unit 14 may be a combination of hardware and software components, also as described in more detail below. The vehicle head unit 14 may include a display 18 for presenting application data. The display 18 in some implementations may be a touchscreen and may include a software keyboard for entering text input, such as financial data for a financial card, a financial card selection, etc. Hardware input controls 22 on the vehicle head unit 14 may be used for entering alphanumeric characters or to perform other functions. The vehicle head unit 14 also may include audio input and output components such as a microphone and speakers, for example.

Furthermore, the vehicle head unit 14 may communicate with a portable device 10 within the vehicle via a communication link, which may be wired (e.g., wired Universal Serial Bus (USB)) or wireless (e.g., Bluetooth, Wi-Fi Direct, wireless USB). For example, the portable device 10 may store indications of financial cards, tokens, and/or financial data which may be transmitted to the vehicle head unit 14 when a user adds a new financial card to the vehicle payment application. The portable device 10 may be a tablet computer, a cell phone, a personal digital assistant (PDA), a smart-phone, a laptop computer, a portable media player (not shown), a pager, a wearable computing device, smart glasses, smart watches or bracelets, phablets, other smart devices, devices configured for wired or wireless RF (Radio Frequency) communication, etc.

Moreover, the vehicle head unit 14 may include one or more processor(s) such as a microprocessor coupled to a memory. The memory may be tangible, non-transitory memory and may include any types of suitable memory modules, including random access memory (RAM), read-only memory (ROM), flash memory, other types of persistent memory, etc. The memory may store, for example instructions executable on the processors for a vehicle payment application. The vehicle head unit 14 is described in more detail below with reference to FIG. 2A.

A. Exemplary Vehicle Payment Application

To utilize a vehicle as a payment device, the vehicle payment application may receive and/or store indications of one or more financial cards or financial accounts, a token representing financial data for each financial card, and/or biometric or login information for authorized users to verify that the user is authorized to make payments with the stored financial cards. The vehicle payment application may present indications of each of the stored financial cards on the display 18 of the vehicle head unit 14 and one or more user controls for allowing the user to select one of the financial cards. Upon receiving a selection of one of the financial cards and a request to make payment, the vehicle payment application may transmit the token representing financial data for the selected financial data via a short-range communication link 120 (or radio frequency link) to the POS terminal 20. In some embodiments, the vehicle payment application may transmit the token via a first short-range communication link 120 to the electronic circuitry 50 proximately attached to the exterior of the vehicle. The electronic circuitry 50 may then transmit the token via a second very short-range communication link 122 to the POS terminal 20. In any event, the POS terminal 20 may transmit an electronic receipt to the vehicle head unit 14, and the vehicle payment application may present the electronic receipt on the display 18.

B. Exemplary Electronic Circuitry

The electronic circuitry 50 proximately attached to the exterior of the vehicle may be a combination of hardware and software components, also as described in more detail below. The electronic circuitry 50 may include a wireless transceiver for transmitting/receiving radio signals using NFC, Bluetooth, USB, DSRC, RFID, Wi-Fi, etc. The electronic circuitry 50 may communicate with the vehicle head unit 14 via a first short-range communication link 120. The electronic circuitry 50 may also communicate with the POS terminal 20 via a second very short-range communication link 122. In some embodiments, the electronic circuitry 50 may include one or more processor(s) such as a microprocessor coupled to a memory.

Moreover, the electronic circuitry 50 may store tokens representing financial data for each financial card. For example, the electronic circuitry 50 may be paired with the vehicle head unit 14 via a Bluetooth connection. When the user enters a new financial card on the vehicle head unit, the generated token representing financial data for the financial card may be transmitted and/or stored in the electronic circuitry 50. When the user later selects the financial card for making a payment, the vehicle head unit 14 may transmit an indication of the financial card to the electronic circuitry 50 and the electric circuitry 50 may retrieve the corresponding token and/or transmit the corresponding token to the POS terminal. In other embodiments, the vehicle head unit 14 may transmit the token to the electronic circuitry 50 each time the electronic circuitry 50 is called upon in the payment process. The electronic circuitry 50 is described in more detail below with reference to FIG. 2B.

C. Exemplary POS Terminal

The POS terminal 20 may be a combination of hardware and software components and may include a display, a camera, and/or one or more processor(s) such as a microprocessor coupled to a memory. The POS terminal 20 may also include a wired and/or wireless transceiver for transmitting/receiving radio signals using NFC, Bluetooth, DSRC, RFID, USB, Wi-Fi, etc. The POS terminal 20 may communicate with the vehicle head unit 14 and/or the electronic circuitry via a short-range and/or very short-range communication link. Additionally, the POS terminal 20 may communicate with other devices via a wired and/or wireless long-range communication network 130 such as a proprietary network, a secure public Internet, a wide area network (WAN), the Internet, and/or some other type of network, such as dedicated access lines, plain ordinary telephone lines, satellite links, combinations of these, etc.

Where the digital network 130 comprises the Internet, data communication may take place over the digital network 130 via an Internet communication protocol. For example, upon receiving a token and/or financial data for a financial card the POS terminal 20 may transmit the received data to an acquiring bank server which may in turn transmit the received data to an issuing bank server for the financial card. The issuing bank server may then transmit an indication back to the POS terminal 20 that the payment has been accepted. For example, the issuing bank server may communicate with the third party token server 104 to retrieve the financial data corresponding to the token and generate a charge for the corresponding financial card. Alternatively, the issuing bank server may obtain the financial card corresponding to the token and/or financial data in any other suitable manner. In other scenarios, when the received data cannot be verified at the issuing bank server or the corresponding financial card does not have a sufficient balance and/or sufficient credit to make the payment, the issuing bank server may transmit an indication to the POS terminal 20 that the payment has been declined.

While the POS terminal 20 is depicted in FIG. 1 as attached to a fuel station, this is merely one example embodiment. The POS terminal 20 may be a stand-alone device, may be attached to a drive-thru window at a drive-thru and/or car wash, and/or may be presented in any other suitable manner.

D. Exemplary Token Server

According to embodiments, the third-party token server 104 may be a combination of hardware and software components, also as described in more detail below. The third-party token server 104 may have an associated database for storing tokens, the financial data represented by the tokens, and/or the financial cards corresponding to the financial data. Moreover, the third-party token server 104 may include one or more processor(s) such as a microprocessor coupled to a memory.

The memory may be tangible, non-transitory memory and may include any types of suitable memory modules, including random access memory (RAM), read-only memory (ROM), flash memory, other types of persistent memory, etc. The memory may store, for example instructions executable on the processors for generating/transmitting tokens and/or storing the tokens with associated financial data/financial cards.

It will be appreciated that although only one third-party token server 104 is depicted in FIG. 1, multiple third-party token servers 104 may be provided for the purpose of distributing server load, serving different web pages, etc. These multiple third-party token servers 104 may include a web server, an entity-specific server (e.g. an Apple® server, etc.), a server that is disposed in a retail or proprietary network, etc.

The third-party token server 104 may communicate with the vehicle head unit 14 via the network 130. For example, the vehicle head unit 14 may transmit financial data for a financial card to the third-party token server 104 and in turn, the third-party token server may generate/transmit a token representing the financial data to the vehicle head unit 14. The vehicle payment application in the vehicle head unit 14 may then store the token with an indication of the financial card and/or transmit the token when making a payment with the corresponding financial card.

II. Exemplary System Hardware

A. Exemplary Vehicle Head Unit

Figure 2A:
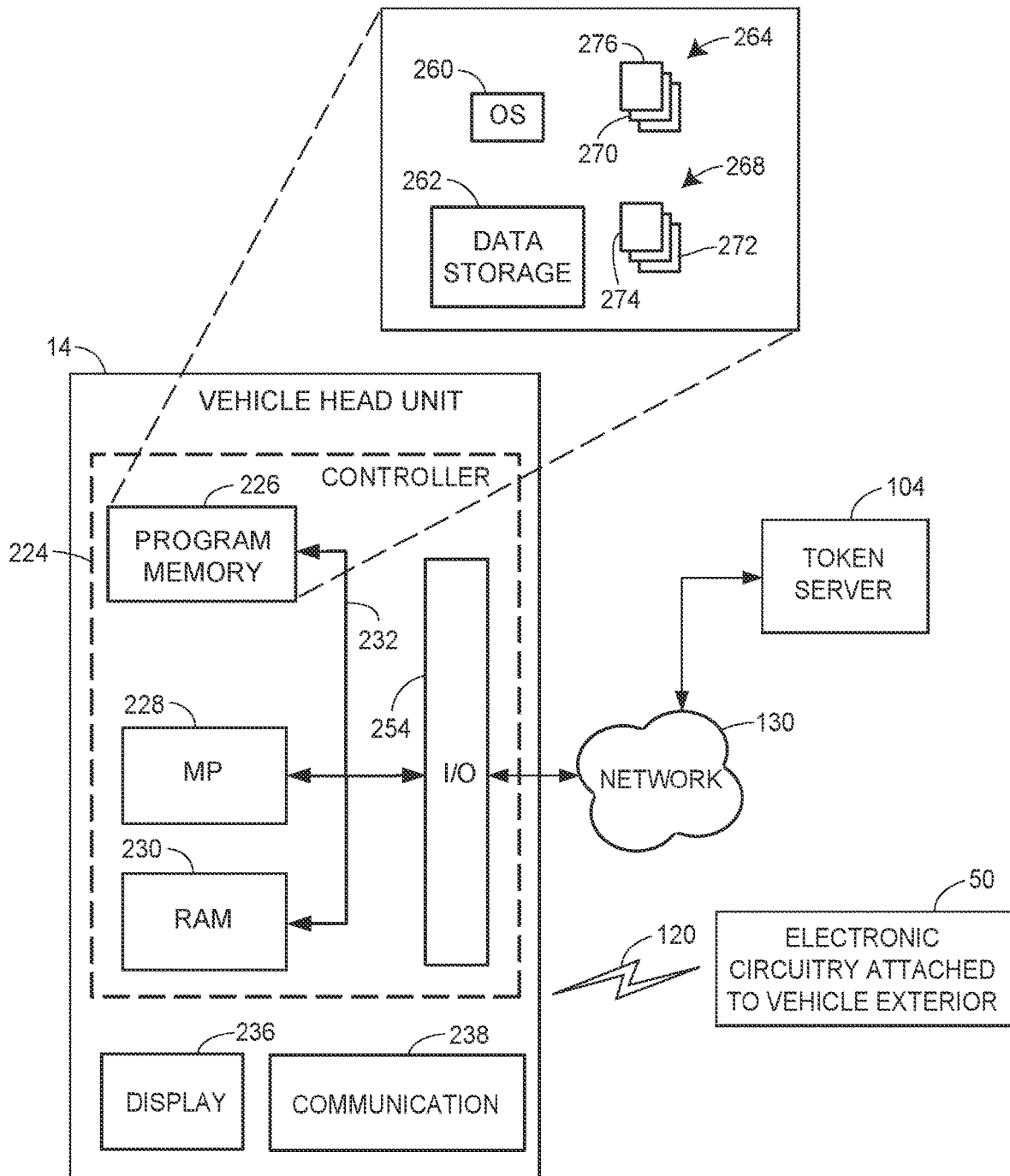
FIG. 2A illustrates a block diagram of an exemplary vehicle head unit in accordance with an exemplary aspect of the present disclosure.

Turning now to FIG. 2A, the vehicle head unit 14, may include a display 236 similar to the display 18 as shown in FIG. 1, a communication unit 238, a user-input device (not shown), a camera and/or other image sensor (not shown), and/or a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. The program memory 226 and the microprocessor 228 may be similar to the memory and processor respectively, as described in FIG. 1.

The program memory 226 may include an operating system 260, a data storage 262, a plurality of software applications 264, and/or a plurality of software routines 268. The operating system 260, for example, may include iOS®, Android™, Palm® webOS, Windows Mobile/Phone, BlackBerry® OS, Symbian® OS, Microsoft Windows®, OS X®, Linux®, Unix®, etc. The data storage 262 may include data such as user profiles, indications of financial cards, tokens, application data for the plurality of applications 264, routine data for the plurality of routines 268, and/or other data necessary to interact with the third-party token server 104, electronic circuitry 50, and/or POS terminal 20 through the digital network 130, and/or short-range/very short-range communication links 120, 122. In some embodiments, the controller 224 may also include, or otherwise be communicatively connected to, other data storage mechanisms (e.g., one or more hard disk drives, optical storage drives, solid state storage devices, etc.) that reside within the vehicle head unit 14.

The communication unit 238 may include one or more transceivers, and/or communicate with the third-party token server 104 via any suitable wireless communication protocol network, such as a wireless telephony network (e.g., GSM, CDMA, LTE, etc.), a Wi-Fi network (802.11 standards), a WiMAX network, etc. Additionally, the communication unit 238 may communicate with the electronic circuitry 50 and/or POS terminal via any suitable short-range/very short-range wired or wireless communication protocol network, such as USB, Bluetooth, Wi-Fi, NFC, RFID, DSRC, etc. The user-input device (not shown) may include a "soft" keyboard that is displayed on the display 236 of the vehicle head unit 14, an external hardware keyboard such as the hardware input controls 22 as shown in FIG. 1, or any other suitable user-input device.

It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

The one or more processors 228 may be adapted and configured to execute any one or more of the plurality of software applications 264 and/or any one or more of the plurality of software routines 268 residing in the program memory 226, in addition to other software applications. One of the plurality of applications 264 may be a vehicle payment application 266 that may be implemented as a series of machine-readable instructions for performing the various tasks associated with receiving information at, displaying information on, and/or transmitting information from the vehicle head unit 14.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information while also receiving inputs from the user. Another application of the plurality of applications may include an embedded web browser 276 that may be implemented as a series of machine-readable instructions for receiving, interpreting, and/or displaying web page information. One of the plurality of routines may include a financial card storage routine 272 which obtains financial data for a financial card from the user and/or a portable device, transmits the financial data to a third-party token server 104 and stores a received token with an indication of the financial data at the vehicle payment application 266. Another routine in the plurality of routines may include a payment routine 274 that receives a selection of a stored financial card and transmits a token representing financial data for the financial card to the POS terminal 20 for making a payment.

Preferably, a user may launch the vehicle payment application 266 from the vehicle head unit 14 to communicate with the third-party token server 104, the electronic circuitry 50 and/or the POS terminal 20 to implement the vehicle payment system 100. Additionally, the user may also launch or instantiate any other suitable user interface application (e.g., the native application or web browser 270, or any other one of the plurality of software applications 264) to access the third-party token server 104, the electronic circuitry 50 and/or the POS terminal 20 to realize the vehicle payment system 100.

In one embodiment, to interact with the vehicle payment system 100, the user may execute the vehicle payment application 266 on the vehicle head unit 14. Using the vehicle payment application 266, the user may make payments by navigating a series of vehicle payment application screens. FIGS. 3A-E depict vehicle payment application pages and/or screens that may be displayed on the vehicle head unit 14 in various embodiments of the vehicle payment system 100. However, the screens depicted in FIGS. 3A-E are merely illustrations of an exemplary embodiment. In some embodiments, the vehicle head unit 14 may display web pages. While the vehicle payment application 266 may retrieve application data such as indications of financial cards, tokens, user profiles, etc. from the data storage 262 as described above, the application data may also be stored in one or more server devices (not shown). In some embodiments, the vehicle payment application 266 may communicate with the one or more server devices to transmit/receive server data and/or to implement the vehicle payment system 100.

In any event, the user may launch the vehicle payment application 266 from the vehicle head unit 14 via any suitable manner, such as touch-selecting a vehicle payment application icon (not shown) on the display 236 of the vehicle head unit 14 and/or using one of the hardware input controls 22. After the user launches the vehicle payment application 266, a payment activation screen of the vehicle payment application 266 may be displayed to the user on the vehicle head unit.

B. Exemplary Electronic Circuitry

Figure 2B:
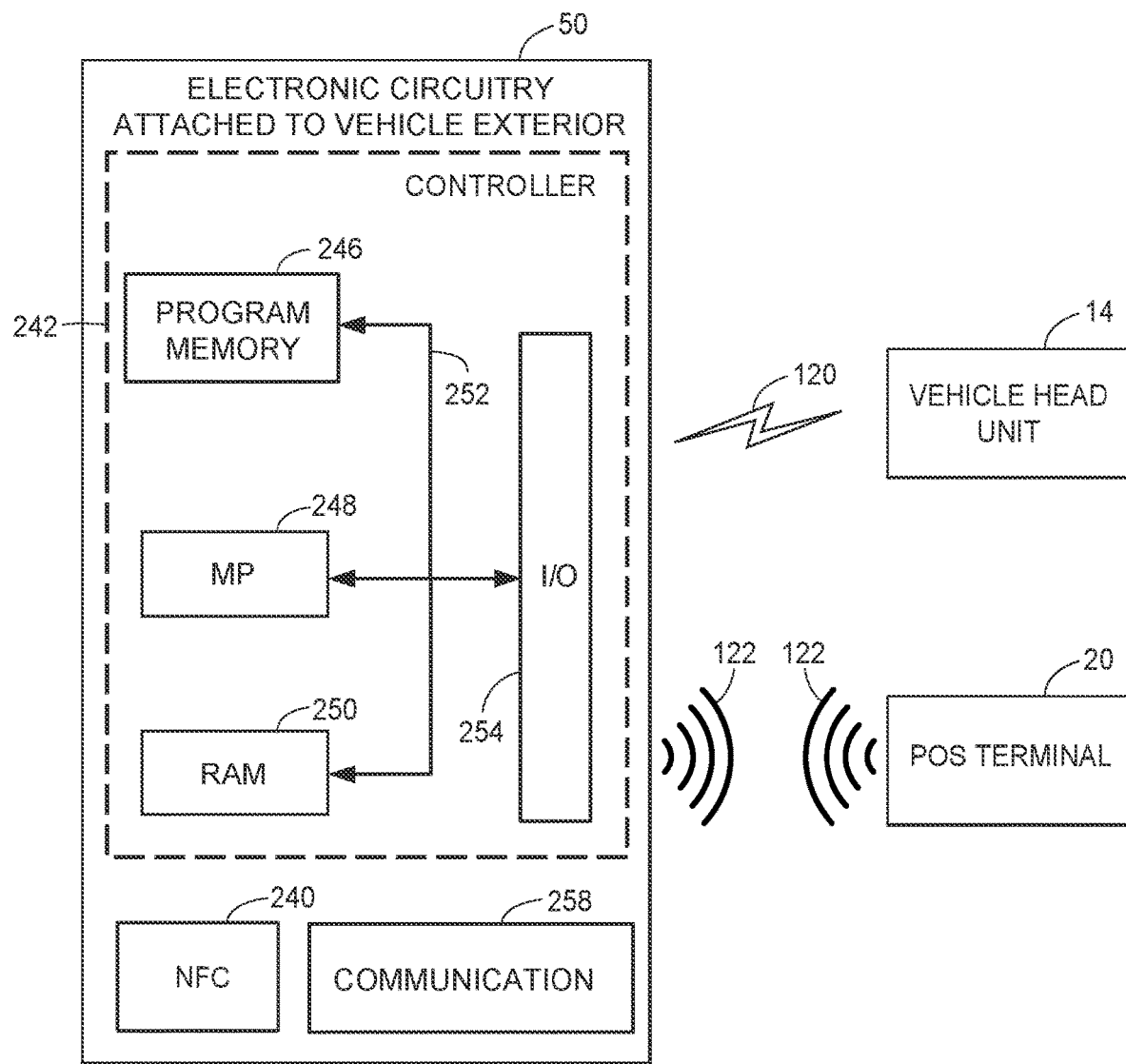
FIG. 2B illustrates a block diagram of exemplary electronic circuitry attached to the exterior of the vehicle in accordance with an exemplary aspect of the present disclosure.

Referring now to FIG. 2B, the electronic circuitry 50 (also referred to herein as "electronic device") may include an NFC module 240 and a communication unit 258. The electronic circuitry 50 may be proximately attached to the exterior of the vehicle 12. Locations on the interior of the vehicle 12 which are within several inches or a foot from the exterior of the vehicle 12 may be proximate to the exterior of the vehicle 12. For example, the electronic circuitry 50 may be attached to a door panel or fuel cap of the vehicle 12 on the exterior of the vehicle 12. In another example, the electronic circuitry 50 may be attached to a fuel cap from the interior of the vehicle 12 and proximate to the exterior of the vehicle 12. In this manner, the electronic circuitry 50 may be placed in very close proximity of a POS terminal 20 (e.g., within one inch, three inches, six inches, a foot, three feet, etc.) to securely transmit financial data or a token representing the financial data.

In some embodiments, like the vehicle head unit 14, the electronic circuitry 50 may also include a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include a data storage and/or a plurality of software routines. The data storage may include data such as indications of financial cards, tokens, etc. In some embodiments, the controller 242 may also include, or otherwise be communicatively connected to, other data storage mechanisms (e.g., one or more hard disk drives, optical storage drives, solid state storage devices, etc.) that reside within the electronic circuitry 50.

The communication unit 258 may include one or more transceivers, and/or communicate with the vehicle head unit 14 and/or the POS terminal 20 via any suitable short-range/very short-range wired or wireless communication protocol network, such as USB, Bluetooth, Wi-Fi, NFC, RFID, DSRC, etc. For example, using the NFC module 240, the communication unit 258 may communicate with the POS terminal using NFC.

As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of a plurality of software routines residing in the program memory 246. One of the plurality of routines may include a device recognition routine which identifies devices within range for communication, such as a POS terminal 20 which may communicate with the electronic circuitry 50. Another routine in the plurality of routines may include a token transmission routine which retrieves a token from data storage in response to receiving an indication of a selected financial card from the vehicle head unit 14. The token may also be retrieved from the vehicle head unit 14. The token transmission routine may then transmit the obtained token corresponding to the financial card to a POS terminal.

III. Exemplary Screenshots of a Vehicle Payment Application

In the present aspects, the following screenshots shown in FIGS. 3A-E are examples of what may be displayed to a user as part of a vehicle payment application 266. In the present aspects, the following exemplary screenshots shown in FIGS. 3A-E may be displayed on the vehicle head unit 14 as shown in FIG. 1. As will be appreciated by those of ordinary skill in the relevant art(s), the exemplary screenshots shown in FIGS. 3A-E are for illustrative purposes, and their associated functionality may be implemented using any suitable format and/or design for facilitating their corresponding described functionalities without departing from the spirit and scope of the present disclosure.

Moreover, the following exemplary screenshots shown in FIGS. 3A-E may be presented on the display 236 of the vehicle head unit 14 when the vehicle is operated by a user. When the vehicle 12 is an autonomous vehicle, the autonomous vehicle may receive and/or interact with the information presented by the vehicle payment application 266 without presenting all of the exemplary screenshots. For example, the autonomous vehicle may receive indications of stored financial cards and/or select one of the stored financial cards for making a payment without the indications being presented on the display 236 of the vehicle head unit 14. In other embodiments, the exemplary screenshots may be presented on the vehicle head unit 14 of the autonomous vehicle to allow users within the autonomous vehicle to interact with the vehicle payment application 266.

A. Exemplary Financial Card Entry Screen

Figure 3A:
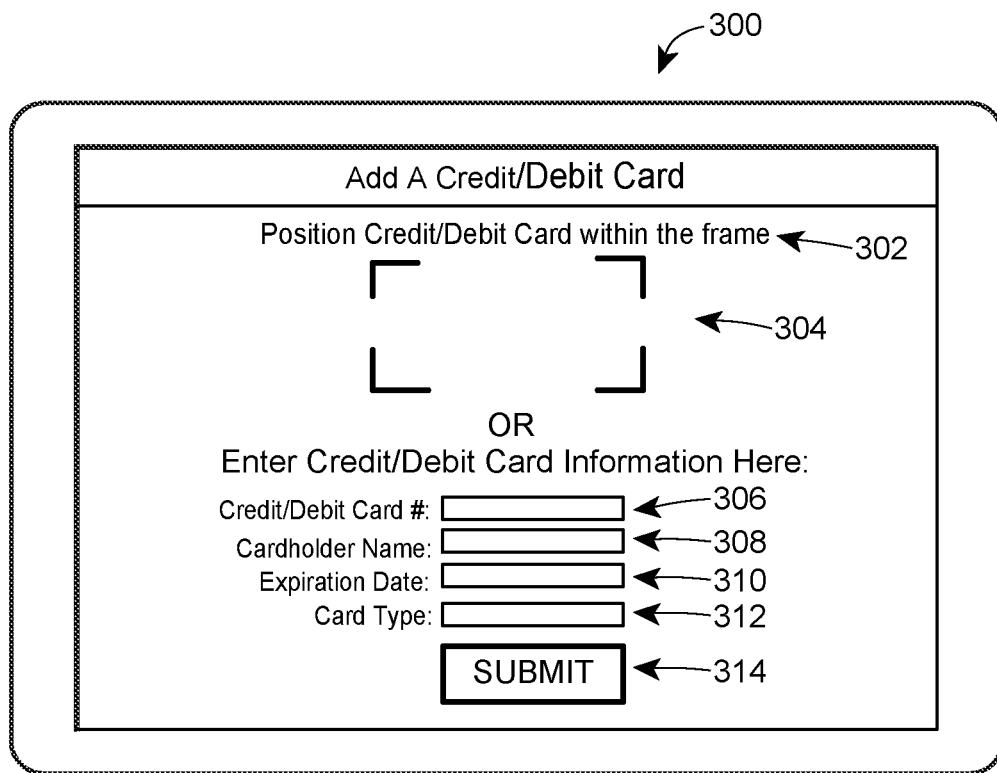
FIG. 3A depicts an exemplary financial card entry screen of a vehicle payment application in accordance with an exemplary aspect of the present disclosure.

To add a new financial card or financial account (also referred to herein as a "virtual account") to the vehicle payment application 266, a user may select a user control such as an "Add Credit/Debit Card" button on a home screen (not shown) and/or a financial card selection screen of the vehicle payment application 266. With reference now to FIG. 3A, a financial card entry screen 300 may be displayed on the vehicle head unit 14 when the user selects the "Add Credit/Debit Card" button on the home screen, financial card selection screen, and/or any other suitable screen of the vehicle payment application 266.

The financial card entry screen 300 may include a user control 304 for receiving an image of the financial card at the vehicle head unit 14. For example, the vehicle payment application 266 may instruct the camera within the vehicle head unit 14 to capture an image of the user's financial card. The financial card entry screen 300 may include an instruction to position the financial card within a frame 302, where the frame is included in the user control 304. When a user positions the boundaries of a financial card within the frame of the user control 304, the camera of the vehicle head unit 14 may automatically capture an image of the financial card. In other embodiments, the user may select a user control instructing the capture to capture an image of the financial card when the boundaries of the financial card are positioned within the frame. The camera may capture one and/or both sides of the financial card.

Additionally, the financial card entry screen 300 may include user controls 306-312 for manually entering financial data for the financial card, such as a credit/debit card number 306, a cardholder name 308, an expiration date 310, a card type 312 (e.g., VISA®, MasterCard®, American Express®, Discover®, etc.), a CSC code, and/or any other suitable information such as a billing address, a card nickname, etc.

When an image of the financial card and/or the financial data for the financial card is provided at the financial card entry screen 300, the user may select a "Submit" button 314 to store an indication of the financial card at the vehicle payment application 266. The vehicle payment application 266 may use various image processing techniques, such as optical character recognition (OCR) to identify the financial data included in the image of the financial card. Additionally, the indication of the financial card may be an edited version of the image of the financial card. At least some of the financial data, such as the cardholder name, card number, expiration date and/or CSC code, may be removed and/or masked using various image processing techniques. Accordingly, the edited version of the image of the financial card may display the shape of the financial card, the background color/image of the financial card, the name of the issuer of the financial card (e.g., Chase™, Bank of America™, Wells Fargo™, Citigroup™, PNC™, Capital One™, etc.), the card type (e.g., VISA®, MasterCard®, American Express®, Discover®, etc.), masked financial data such as the last four digits of the financial card, etc. When an image of the financial card is not captured and the user manually enters the financial data for the financial card instead, the vehicle payment application 266 may create an image of the financial card based upon the entered card type. For example, if the card type is American Express®, the vehicle payment application 266 may generate an image of a financial card having a green background color, and/or the name "American Express."

In some embodiments, when the "Submit" button 314 is selected, the vehicle payment application 266 may transmit the financial data retrieved from the image of the financial card 304 or manually entered via the user controls 306-310, to a third-party token server 104 as shown in FIG. 1. The third-party token server 104 may then generate a token which may be a string of randomly generated alphanumeric or numeric characters that represents the financial data. For example, the token may be a 16 digit alphanumeric character string. The third-party token server 104 may store the token with the financial data that the token represents and/or may transmit the token to the vehicle payment application 266 for additional storage. In some embodiments, the third-party token server 104 may provide the financial data to the issuing bank for the financial card after receiving the token from the issuing bank when a payment is processed. In other embodiments, the third-party token server 104 may be the issuing bank. The tokenization process may be completed in any number of ways including but not limited to the system and method for secure acceptance of customer credit card numbers as described in U.S. patent application Ser. No. 14/505,599, which is incorporated by reference herein.

In any event, the vehicle payment application 266 may then store the indication of the financial card so that the user may select the financial card for making a payment at a financial card selection screen, for example. In some embodiments, the token representing financial data for the financial card may be stored with the indication of the financial card. The token may be transmitted when the user selects the financial card for making the payment. In other embodiments, the vehicle payment application 266 may transmit the token to the electronic circuitry 50 as shown in FIG. 1, and/or the electronic circuitry 50 may store the token. In such embodiments, when a user selects a financial card, the vehicle payment application 266 may transmit an indication to the electronic circuitry 50 that the financial card has been selected, and the electronic circuitry may retrieve and/or transmit the token corresponding to the selected financial card.

In addition to capturing an image of the financial card and/or manually entering financial data for the financial card at the financial card entry screen 300, the financial card entry screen 300 may include a user control (not shown) to import the financial card from another application such as a photo library, email application, etc., and/or an external source such as a portable device 10 in communication with the vehicle head unit 14. In this manner, the user may import indications of financial cards and/or financial data for the financial card from another application and/or from the portable device 10 to the vehicle payment application 266.

B. Exemplary Activation Screen

Figure 3B:
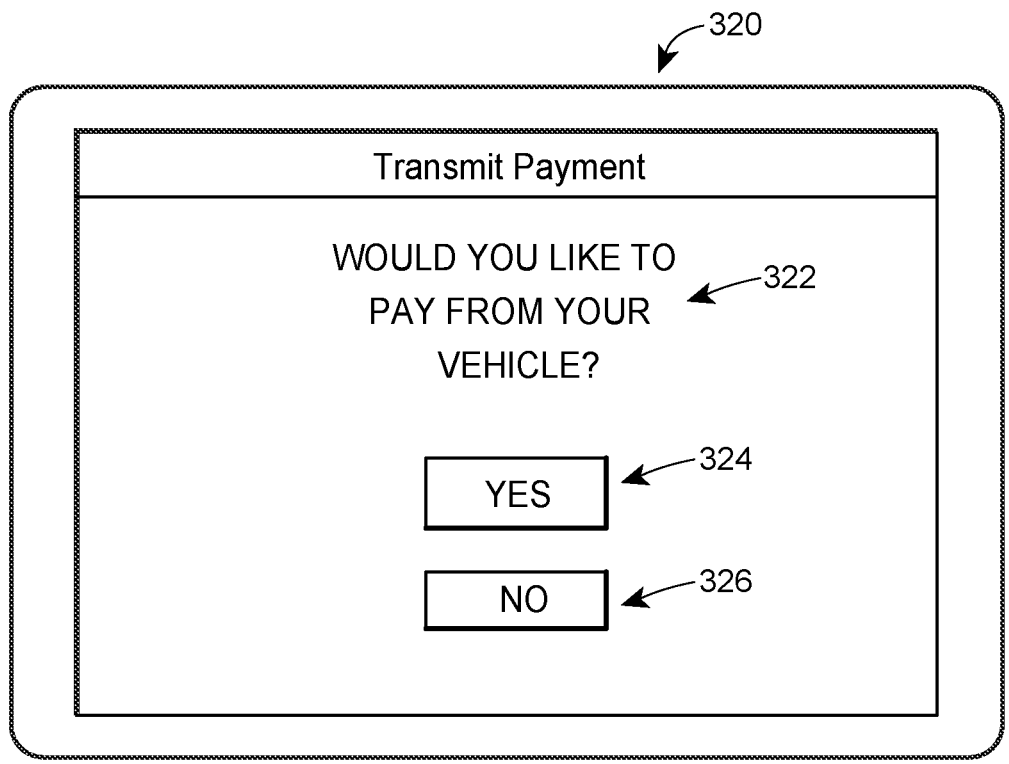
FIG. 3B depicts an exemplary activation screen of a vehicle payment application in accordance with an exemplary aspect of the present disclosure.

When the vehicle detects a POS terminal 20, the vehicle payment application 266 may display a payment activation screen 320 as depicted in FIG. 3B. For example, the vehicle head unit 14 and/or electronic circuitry 50 proximately attached to the exterior of the vehicle may detect the presence of a Bluetooth signal, RFID signal, NFC signal, DSRC signal, Wi-Fi signal, etc. In another example, the vehicle head unit 14 and/or electronic circuitry 50 proximately attached to the exterior of the vehicle may determine that the vehicle is within a predetermined distance of a POS terminal 20. More specifically, the vehicle head unit 14 may obtain locations of merchants (e.g., fuel stations, dry cleaners, fast food or other restaurants, coffee shops, grocery stores, pharmacies, vehicle repair shops, etc.) within a geographic area surrounding the current location of the vehicle head unit 14. The vehicle head unit 14 and/or electronic circuitry 50 proximately attached to the exterior of the vehicle may determine that the vehicle is within a predetermined distance of a POS terminal 20 associated with one of the merchants, when the current location of the vehicle is within the predetermined distance (e.g., 50 feet, 100 feet, 200 feet, etc.) of one of the merchants.

In yet another example, a camera located within the vehicle head unit 14 or other portion of the vehicle may capture images of an area surrounding the vehicle. The images may be visible light images, radar images, infrared images, or any other suitable image within the electromagnetic spectrum including the visible and invisible light spectrums. The vehicle head unit 14 may then analyze these images using various digital image processing techniques (such as object recognition, optical character recognition etc.), to identify merchants as well as their respective locations relative to the location of the vehicle. When a merchant is identified that is within a predetermined distance of the vehicle, the vehicle may detect a POS terminal 20.

In some embodiments, the vehicle head unit 14 and/or electronic circuitry 50 may also identify the device transmitting a signal and/or a name of a corresponding network. When the device transmitting the signal and/or the name of the corresponding network is associated with a POS terminal 20, the vehicle payment application 266 may detect a POS terminal 20. In other embodiments, the vehicle payment application 266 may detect a POS terminal 20 upon detecting the presence of one of the signals mentioned above. Additionally, the vehicle head unit 14 may obtain a list of POS terminals which accepts payments from a vehicle and/or any other type of mobile payments. For example, the vehicle head unit 14 may communicate with a third party server, such as a Department of Motor Vehicles (DMV) server to obtain the list. The detected POS terminal 20 may be compared to the list of POS terminals to determine whether the detected POS terminal 20 accepts vehicle payments. Furthermore, the user may provide a list of preferred merchants and/or merchant locations. The merchant and/or merchant location associated with the detected POS terminal 20 may be compared to the list of preferred merchants to determine whether the user authorizes vehicle payments at the detected POS terminal 20. If the user does not authorize vehicle payments or the detected POS terminal 20 does not accept vehicle payments, the user may manually purchase goods or services provided by the merchant or may navigate to another merchant location.

In any event, upon detecting the POS terminal 20, the vehicle payment application 266 may automatically activate and/or display the payment activation screen 320. In other embodiments, the user may activate the vehicle payment application 266 by touch-selecting a vehicle payment application icon on the display 236 of the vehicle head unit 14, as described above. In yet other embodiments, the POS terminal 20 may identify a vehicle. For example, the POS terminal 20 may detect the presence of a Bluetooth signal, RFID signal, NFC signal, DSRC signal, Wi-Fi signal, etc. In another example, the POS terminal may capture, with a camera communicatively coupled to the POS terminal 20, images of an area surrounding the POS terminal 20. The POS terminal 20 may then analyze these images using various digital image processing techniques (such as object recognition, optical character recognition etc.), to identify a vehicle and/or a vehicle license plate number. In yet another example, the POS terminal 20 may receive an indication from the vehicle head unit 14 and/or electronic circuitry 50 that the vehicle 12 is within a predetermined range of the POS terminal 20. As a result, the POS terminal 20 may transmit the payment activation screen 320 to the vehicle head unit 14 and/or electronic circuitry 50. In addition to displaying the payment activation screen 320, the POS terminal 20, the vehicle head unit 14, and/or the electronic circuitry 50 may establish a communication link between the POS terminal 20 and the vehicle head unit 14 and/or the electronic circuitry 50. The communication link may be a short-range communication link (e.g., Bluetooth, DSRC, RFID, Wi-Fi, USB, etc.), a very short-range communication link (e.g., NFC, HF RFID, etc.) or any suitable combination.

In any event, the payment activation screen 320 may include a prompt 322 asking the user whether she would like to pay from her vehicle, a "YES" button 324, and/or a "NO" button 326. If the user selects the "YES" button 324 by for example, touch-selecting the display 236 of the vehicle head unit 14 or using one of the hardware input controls, the vehicle payment application 266 may present a financial card selection screen on the vehicle head unit 14 for selecting one of the stored financial cards, as described in more detail below. On the other hand, if the user selects the "NO" button 326, the vehicle payment application 266 may automatically close.

In some embodiments, before presenting the financial card selection screen, the POS terminal 20 may transmit data over a short-range communication link 120 to the vehicle head unit 14, and/or over first and second short-range/very short-range communication links 120, 122 to the electronic circuitry 50 and then to the head unit 14. For example, when the establishment associated with the POS terminal 20 is a fuel station, the data may include a request for the user to provide a financial card to the POS terminal 20 before filling up with fuel, which may be presented on the display 236 of the vehicle head unit 14. Then when the fueling process is over, the POS terminal 20 may transmit additional data including the amount of fuel provided to the vehicle, the total cost of the fuel, and/or a request to authorize payment for the total cost of the fuel using the financial card provided to the POS terminal 20. The additional data may be presented on the display 236 of the vehicle head unit 14.

In another example, the establishment associated with the POS terminal 20 may be another type of establishment which provides goods or services at or nearby a user's vehicle, such as a drive-thru or a car wash. The POS terminal 20 may transmit data including the total cost of the goods or services and/or a request for the user to transmit payment to the POS terminal 20. In some embodiments, the user may be prompted to provide permission for the vehicle head unit 14 and/or the electronic circuitry 50 to receive the data from the POS terminal 20.

In some embodiments, the vehicle payment application 266 may store user preferences and/or other information indicative of retailers/merchants preferred by the user. For example, the user may provide indications of preferred retailers/merchants and/or services, goods, or items that the user likes to purchase via the display 236 of the vehicle head unit 14. Additionally, the vehicle payment application 266 may identify user preferences based upon previous purchases made by the user and the establishments and/or types of services, goods, or items that the user typically purchases.

When the vehicle head unit 14 and/or the electronic circuitry 50 detects the presence of short-range/very short-range wireless signal and/or identifies the device transmitting the signal, the vehicle payment application 266 may determine whether the device is associated with an establishment (also referred to herein as a "point of interest (POI)") and/or services, goods, or items which are preferred by the user. When the device is associated with a preferred establishment/item and is within a threshold distance of the vehicle 12, the vehicle payment application 266 may present a message to the user that a preferred establishment/item is nearby. The vehicle payment application 266 may also present an indication of the distance to the preferred establishment/item and/or an indication of the preferred establishment/item such as a name of the preferred establishment/item. Moreover, the vehicle payment application 266 may also display a map of a geographic area including the user's current location with an indication, such as a pin which marks the location of the preferred establishment/item. In another embodiment, the map display may include several indications which mark the locations of preferred establishments/items and/or any other merchants which accept vehicle payments. The vehicle payment application 266 may also determine the distance between the vehicle and each of the preferred establishments/items and/or other merchants based upon their respective positions within the map display.

In some embodiments, the vehicle payment application 266 may provide navigation directions to the location of the preferred establishment/item or a location of one of several preferred establishments/items that is selected by a user. For example, the user may touch-select one of the preferred establishment/items on the map display. In another example, the user may provide a type of goods or services that the user wants to purchase. For instance, the user may request a fast food restaurant. The vehicle payment application 266 may then identify one of the preferred establishment/items included in the map display that provides the type of goods or services that the user wants to purchase.

In yet another example, when the vehicle is an autonomous vehicle, the vehicle payment application 266 may identify a type of goods or services that needs to be purchased, such as fuel for the vehicle. The vehicle payment application 266 may then identify one of the preferred establishment/items included in the map display that provides fuel. For example, the vehicle payment application 266 may identify the closest preferred merchant location that provides fuel and/or any other suitable merchant location on the map display that provides fuel.

The navigation directions may be a set of turn-by-turn navigation instructions for traversing from the current location of the vehicle to the location of the preferred establishment/item. In some embodiments, the vehicle payment application 266 may communicate with a third party server, such as a map server and/or a navigation server which may provide the map data and/or navigation data for displaying a map and navigation directions. For example, the map server may provide indications of several merchant locations to the vehicle payment application 266. The vehicle payment application 266 may then determine which of the merchant locations are within a geographic area surrounding the user's current location. Accordingly, the vehicle payment application 266 may generate a map display of the geographic area and include the indications of merchant location within the geographic area on the map display. The map display may be presented on display 18 of the vehicle head unit 14.

When the vehicle is driven by the user, the navigation directions may be provided audibly via the speakers of the vehicle head unit 14 or visually, where the navigation directions overlay the map display. For example, the vehicle payment application 266 may highlight or otherwise annotate the roads, streets, etc. included in the turn-by-turn navigation directions for traversing from the current location of the vehicle to the location of the preferred establishment/item. When the vehicle is an autonomous vehicle, the navigation directions may be a set of instructions provided to the autonomous vehicle for navigating to the preferred establishment/item. The instructions may include indications of upcoming maneuvers such as turns, distances in which an upcoming maneuver needs to be made (e.g., turning left in three miles), and/or any other suitable instructions for guiding the autonomous vehicle to the preferred establishment/item.

Also in some embodiments, when the user selects the "YES" button 324 indicating she would like to make a payment from her vehicle, the vehicle payment application 266 may authenticate the user to ensure she is authorized to use the stored financial cards to make payments. The vehicle payment application 266 may store biometric information for authorized users, such as fingerprint data, facial data, retinal data, voice data, weight data, etc. To authenticate the user, the vehicle payment application 266 may retrieve a biometric identifier from the user. For example, the vehicle head unit 14 may capture an image of the user, a microphone in the vehicle head unit 14 may capture voice data for the user, the user may press a finger on the vehicle head unit 14 for the vehicle payment application 266 to receive fingerprint data, weight or pressure sensors in the vehicle may determine the weight of the user, and/or a biometric identifier for the user may be obtained in any other suitable manner. The vehicle payment application 266 may then verify the received biometric identifier by comparing the obtained biometric identifier to stored biometric information for authorized users. If the obtained biometric identifier matches the stored biometric information, the vehicle payment application 266 may determine the user is an authorized user and present the financial card selection screen, as described below.

In some scenarios, for example when the vehicle is an autonomous vehicle, the vehicle payment application 266 may authenticate the vehicle to ensure that the vehicle is authorized to use the stored financial cards to make payments. For example, a camera within the vehicle head unit 14 or another portion of the vehicle may capture an image of the license plate. Using digital image processing techniques such as objection recognition and/or optical character recognition, the vehicle head unit 14 may identify the license plate number for the vehicle. The license plate number may be compared to a stored license plate number for an authorized vehicle. If the obtained license plate number matches the stored license plate number, the vehicle payment application 266 may determine the vehicle is an authorized vehicle and present the financial card selection screen, as described below. In some embodiments, the vehicle payment application 266 and/or the POS terminal 20 may transmit the license plate number or other vehicle identification information (e.g., a make/model of the vehicle, a vehicle identification number (VIN), etc.) to a third party server for verifying that the autonomous vehicle has not been stolen. The third party server may then compare the vehicle identification information to stolen vehicle records to ensure that the autonomous vehicle has not been stolen.

In other embodiments, the POS terminal 20 may authenticate the vehicle and/or a user within the vehicle by receiving a biometric identifier from the user and/or vehicle identification information. The biometric identifier and/or vehicle identification information may be compared to a database of authorized users or vehicles, and if there is a match, the POS terminal 20 may verify that the user and/or vehicle is authorized to make vehicle payments. For example, when an autonomous vehicle is authorized to make vehicle payments using a particular financial card, a user may register the autonomous vehicle as an authorized vehicle. In some embodiments, the financial card or virtual account may also be registered with the user and/or vehicle. Accordingly, when the user and/or vehicle transmits financial data/virtual account information for the financial card/virtual account to the POS terminal 20, the POS terminal 20 may verify that the user and/or vehicle is authorized to make payments with the financial card/virtual account.

The vehicle payment application 266 may also store a username and/or password, a PIN number, and/or any other unique identifier for authorized users. To authenticate the user, the vehicle payment application 266 may receive login information, such a username and password, a PIN number, or identification information from an authenticated key fob and verify the login information by comparing the login information to the stored unique identifier. When there is a match, the vehicle payment application 266 may determine that the user is an authorized user. In yet other embodiments, the vehicle head unit 14 may detect the presence of a portable device 10, for example from a short-range/very short-range communication link. The portable device 10 may be used to authenticate the user by transmitting a unique identifier to the vehicle head unit 14 and/or transmitting any other suitable information indicating that the portable device 10 belongs to an authorized user. If the user is not authenticated, the vehicle payment application 266 may not display the financial card selection screen and/or may continue to receive a biometric identifier and/or login information for the user.

As mentioned above, when the vehicle 12 is an autonomous vehicle, the vehicle payment application 266 may not display the payment activation screen 320. Instead, the autonomous vehicle may communicate with the vehicle payment application 266 to initiate the payment process.

C. Exemplary Financial Card Selection Screen

Figure 3C:
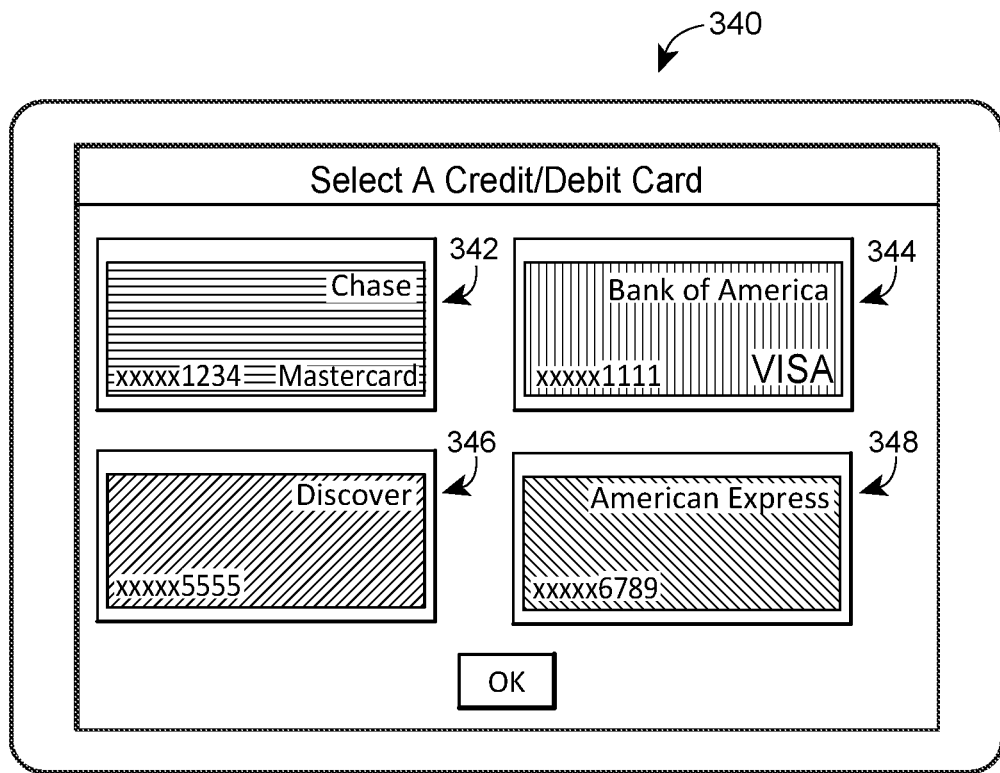
FIG. 3C depicts an exemplary financial card selection screen of a vehicle payment application in accordance with an exemplary aspect of the present disclosure.

In response to the user selecting the "YES" button 324 on the payment activation screen 320 and/or authenticating the user, the vehicle payment application 266 may present a financial card selection screen 340 as depicted in FIG. 3C. The vehicle payment application 266 may also present the financial card selection screen 340 in response to a request from the POS terminal 20 to provide a financial card and/or transmit payment to the POS terminal. In any event, the financial card selection screen 340 may include indications of financial cards 342-348 which were added at the financial card entry screen 300 as shown in FIG. 3A. The financial card selection screen 340 may also include user controls for selecting the financial cards. For example, a user may select the Discover® card 346 by touch-selecting the area of the display 236 which includes the Discover® card 346.

As mentioned above, each of the indications of financial cards 342-348 may include an edited version of the image of the financial card where at least some of the financial data, such as the cardholder name, card number, and/or expiration date, is removed and/or masked. Accordingly, the edited version of the image of the financial card may display the shape of the financial card, the background color/image of the financial card, the name of the issuer of the financial card (e.g., Chase™, Bank of America™, Wells Fargo™, Citigroup™, PNC™, Capital One™, etc.), the card type (e.g., VISA®, MasterCard®, American Express®, Discover®, etc.), masked financial data such as the last four digits of the card number, etc. For example, the indication of the VISA® card 344 includes a rectangular image having Bank of America™ as the name of the issuing bank, VISA® as the card type, and a red background color. The user may touch-select the VISA® card 344, and as a result the vehicle payment application 266 may present a payment authorization screen, as described in more detail below in FIG. 3D.

While the indications of financial cards 342-348 are displayed adjacent to each other in the financial card selection screen 340, this is merely an exemplary embodiment. In other embodiments, the indications of financial cards 342 may be displayed such that they are layered on top of each other where a portion of some of the indications 342-348 is occluded. Moreover, the indications of financial cards 342-348 may displayed on the financial card selection screen 340 in any suitable manner to allow the user to select one of the financial cards. Furthermore, additional and/or alternative information may be included in the indications of financial cards, such as a nickname for the financial card, a billing address for the financial card, and/or any other suitable information.

As mentioned above, when the vehicle 12 is an autonomous vehicle, the vehicle payment application 266 may not display the financial card selection screen 340. Instead, the autonomous vehicle may communicate with the vehicle payment application 266 to select a financial card. For example, the autonomous vehicle may select one of the stored financial cards based upon the credit limits for the stored financial cards, an amount of money corresponding to each of the stored financial cards, a preference for a particular financial card previously indicated by a user, or in any other suitable manner.

D. Exemplary Payment Authorization Screen

Figure 3D:
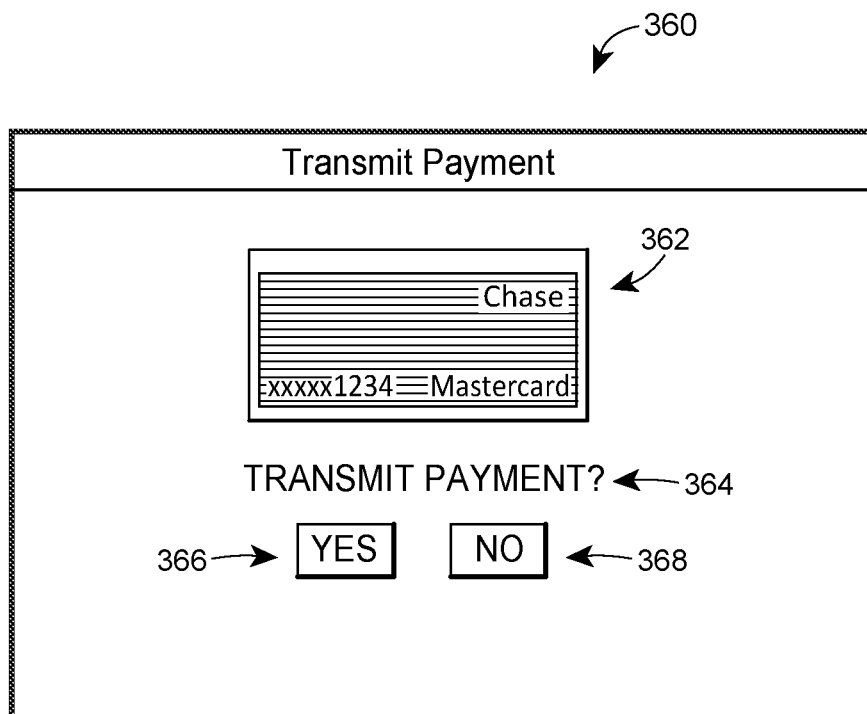
FIG. 3D depicts an exemplary payment authorization screen of a vehicle payment application in accordance with an exemplary aspect of the present disclosure.

Turning now to FIG. 3D, a payment authorization screen 360 may be presented by the vehicle payment application 266, when the user selects a financial card for making a payment. The payment authorization screen 360 may include an indication of the selected financial card 362, a request to transmit payment 364, and/or "YES" and "NO" buttons 366, 368. In some embodiments, the payment authorization screen 360 may also include an indication of the goods or services purchased and/or a total cost of the goods or services provided by the establishment associated with the POS terminal 20. When the establishment is a fuel station, the total cost may not be available and instead, the user may provide the financial card to the POS terminal 20 before receiving fuel. Then when the fueling process is finished, the vehicle payment application 266 may present an additional screen (not shown) to authorize payment for the total cost of the fuel. The additional screen may display the total cost.

In some embodiments, the POS terminal 20 may also transmit links to loyalty reward programs, which may be presented on the payment authorization screen 360. In this manner, the user may receive loyalty reward points for transmitting the payment and/or may receive discounts on the purchase. Further, the vehicle payment application 266 may include spending limits for each of the stored financial cards, which may be monthly spending limits, yearly spending limits, etc. For example, a parent and/or guardian of the user may set a monthly spending limit on one of the stored financial cards. When transmitting the payment would cause the user to exceed the allotted spending limit for the financial card, the payment authorization screen 360 may include a message indicating that the payment would cause the financial card to exceed the spending limit and/or requesting the user to select another financial card. In some scenarios, the user may be able to override the spending limit, for example by entering an emergency override code, receiving permission from the parent and/or guardian who entered the spending limit, etc.

In any event, when the user selects the "YES" button 366, the POS terminal 20 may receive a token representing financial data (e.g., a cardholder name, a card number, an expiration date, card type, and/or a CSC code) for the financial card. For example, the vehicle payment application 266 may transmit the token for the financial card to the POS terminal 20 via a short-range communication link. In another example, the vehicle payment application 266 may transmit the token for the financial card to the electronic circuitry 50 proximately attached to the exterior of the vehicle 12 via a first short-range communication link, which may in turn transmit the token for the financial card to the POS terminal 20 via a second very short-range communication link, such as NFC, HF RFID, etc.

In yet another example, the vehicle payment application 266 may have transmitted the token for the financial card to the electronic circuitry 50 when the financial card was initially added to the vehicle payment application 266. When the user selects the financial card by selecting the "YES" button 366, the vehicle payment application 266 may transmit an indication of the selected financial card to the electronic circuitry 50. The indication may be the card type, the name of the issuing bank, the last four digits of the card number, and/or a combination of these. The electronic circuitry 50 may in turn, retrieve the token corresponding to the selected financial card, and/or transmit the token to the POS terminal 20. The POS terminal 20 may then use the token to process the payment from the selected financial card.

On the other hand, when the user selects the "NO" button 368, the vehicle payment application 266 may display the financial card selection screen 340 as shown in FIG. 3C to allow the user to select another financial card.

When the establishment associated with the POS terminal 20 is a fuel station, the vehicle payment system 100 may include further functionality in addition to making payments from a vehicle. For example, when the user selects the "YES" button 366 to transmit the token for the financial card to the POS terminal 20, the vehicle payment application 266 may cause the fuel cap of the vehicle 12 to automatically be opened for receiving fuel. In some embodiments, the fuel cap of the vehicle 12 may be a door which may be attached to a door opening/closing mechanism such as a lever. The electronic circuitry 50 proximately attached to the exterior of the vehicle 12 may be communicatively coupled to the door opening/closing mechanism and may control the door opening/closing mechanism. In addition to transmitting the token for the financial card, the vehicle payment application 266 may transmit a request to the electronic circuitry 50 to open the door. In other embodiments, the vehicle head unit 14 may be communicatively coupled to the door opening/closing mechanism and may transmit a control signal to the door opening/closing mechanism to open the door.

The fuel tank of the vehicle 12 may also open automatically when the nozzle which provides the fuel makes contact with the fuel tank opening. For example, the fuel tank opening may expand when receiving pressure from the nozzle and/or condense when the nozzle is removed from the fuel tank opening. In some embodiments, the fuel tank opening may be made of an elastic material which stretches when receiving pressure from the nozzle.

Additionally in some embodiments, the fuel pump at the fuel station may be a smart fuel pump and the nozzle may be controlled automatically, for example via a robotic/mechanical arm. Accordingly, when the POS terminal 20 receives the token and the fuel cap is opened, the vehicle head unit 14 and/or the electronic circuitry 50 may transmit a signal to the POS terminal 20 indicating that the fuel cap is opened and requesting the POS terminal 20 to provide fuel to the vehicle 12. In some embodiments, the robotic/mechanical arm may include one or several sensors to detect the height and/or position of the fuel tank opening (e.g., via proximity sensors, such as ultrasonic, infrared, or radar sensors or any other suitable sensors that transmit light beams to detect distance and/or shape) and/or to detect that the fuel tank is open (e.g., via various image processing techniques). The robotic/mechanical arm and/or the smart fuel pump may also calculate the distance between the fuel pump and the fuel tank opening and/or compare this distance to a predetermined maximum distance for placing the nozzle within the fuel tank opening. In other embodiments, the vehicle head unit 14 and/or the electronic circuitry 50 may transmit the position of the fuel tank opening to the POS terminal 20, including the height off the ground of the fuel tank opening, the distance between the fuel tank opening and the POS terminal, etc. When the fuel tank opening is within the predetermined maximum distance and/or the vehicle is not moving, the robotic/mechanical arm may automatically place the nozzle within the fuel tank opening and provide fuel to the vehicle 12.

On the other hand, when the fuel tank opening is outside the predetermined maximum distance, the POS terminal 20 may transmit a signal to the vehicle head unit 14 and/or the electronic circuitry 50 requesting that the vehicle 12 be moved to a particular location. For example, when the vehicle 12 is user-operated the POS terminal 20 may transmit a request to move to a particular location which may be presented on the display 236 of the vehicle head unit 14. In other embodiments, the POS terminal 20 may include speakers and may transmit a voice announcement directing the user to the particular location. In yet other embodiments, the POS terminal 20 may transmit an image of the position of the vehicle 12 with an indication of a position that the vehicle need to move to, such as a rectangular outline. The image may be presented on the display 236 of the vehicle head unit 14.

When the vehicle 12 is autonomous or semi-autonomous, the request may be transmitted to the vehicle head unit 14 to communicate with the software which controls operation of the vehicle. In any event, the request to move to a particular location may include a request to move the vehicle 12 forward a particular distance, to move the vehicle 12 in reverse a particular distance 12, to move the vehicle 12 a particular distance toward the fuel pump, and/or a combination of these. When the vehicle 12 moves within the predetermined maximum distance, the robotic arm may automatically place the nozzle within the fuel tank opening and provide fuel to the vehicle 12. In some embodiments, the autonomous or semi-autonomous vehicle 12 may automatically navigate to the merchant location associated with the POS terminal 20. The autonomous or semi-autonomous vehicle 12 may also automatically position itself for receiving the goods or services provided by the merchant, such as positioning the autonomous or semi-autonomous vehicle 12 to receive fuel from a nozzle.

In this manner, the entire fueling process may be controlled automatically without requiring the user to leave his car. Instead, the user may pay for and fill his vehicle with fuel simply by selecting controls on the vehicle head unit 14. Also when the vehicle 12 is autonomous, the autonomous vehicle may travel to the fuel station, receive fuel, and/or pay for the fuel without any assistance from a human.

In addition to making payments from a vehicle, automatically opening and closing a fuel cap and/or communicating with a robotic arm, the electronic circuitry 50 and/or the vehicle head unit 14 may communicate with a fuel level sensor in the fuel tank. The vehicle 12 may include a fuel level sensor which measures the amount of fuel in the fuel tank. The electronic circuitry 50 and/or the vehicle head unit 14 may be communicatively coupled to the fuel level sensor.

When the user selects the "YES" button 366 to transmit the token for the financial card and/or open the fuel cap of the vehicle 12, the electronic circuitry 50 and/or the vehicle head unit 14 may measure the amount of fuel in the fuel tank via the fuel level sensor. The electronic circuitry 50 and/or the vehicle head unit 14 may perform an additional measurement of the amount of fuel at the end of the fueling process. Based upon these measurements, the vehicle head unit 14 and/or the electronic circuitry 50 may determine the amount of fuel provided to the vehicle from the fuel pump based upon a change in the amount of fuel before and after the fueling process. As a result, the vehicle head unit 14 and/or the electronic circuitry 50 may estimate a total cost of the fuel based upon the amount of fuel provided to the vehicle. The estimated total cost may be compared to the total cost generated by the POS terminal 20. When the estimated total cost and the total cost generated by the POS terminal 20 differ by more than a threshold amount (e.g., 10 percent), the vehicle head unit 14 and/or the electronic circuitry 50 may detect a fraudulent charge. Accordingly, the electronic circuitry 50 may transmit an indication that the payment should not be authorized to the vehicle head unit 14, and/or the vehicle payment application 266 may present a recommendation on the vehicle head unit 14 not to authorize payment for the fuel.

In other embodiments, the electronic circuitry 50 and/or the vehicle head unit 14 may communicate with a fuel level sensor in the fuel tank to identify when the vehicle needs fuel. For example, when the fuel level is below a predetermined threshold (e.g., one-quarter of a tank), the vehicle head unit 14 may determine that the vehicle needs fuel. Accordingly, the vehicle head unit 14 may provide an indication to the user that the vehicle needs fuel and/or may provide a map display including navigation directions to the nearest fuel station which accepts vehicle payments. When the vehicle is an autonomous or semi-autonomous vehicle, the vehicle head unit 14 may automatically provide instructions for the vehicle to navigate to the nearest fuel station and/or a preferred fuel station which accepts vehicle payments. In addition to detecting fraudulent charges and identifying when the vehicle needs fuel, the fuel level sensor may also be used to determine that the fuel tank is full. When the fuel tank is full, the electronic circuitry 50 and/or the vehicle head unit 14 may communicate with the POS terminal 20, so that the smart fuel pump stops providing fuel.

E. Exemplary Electronic Receipt Screen

Figure 3E:
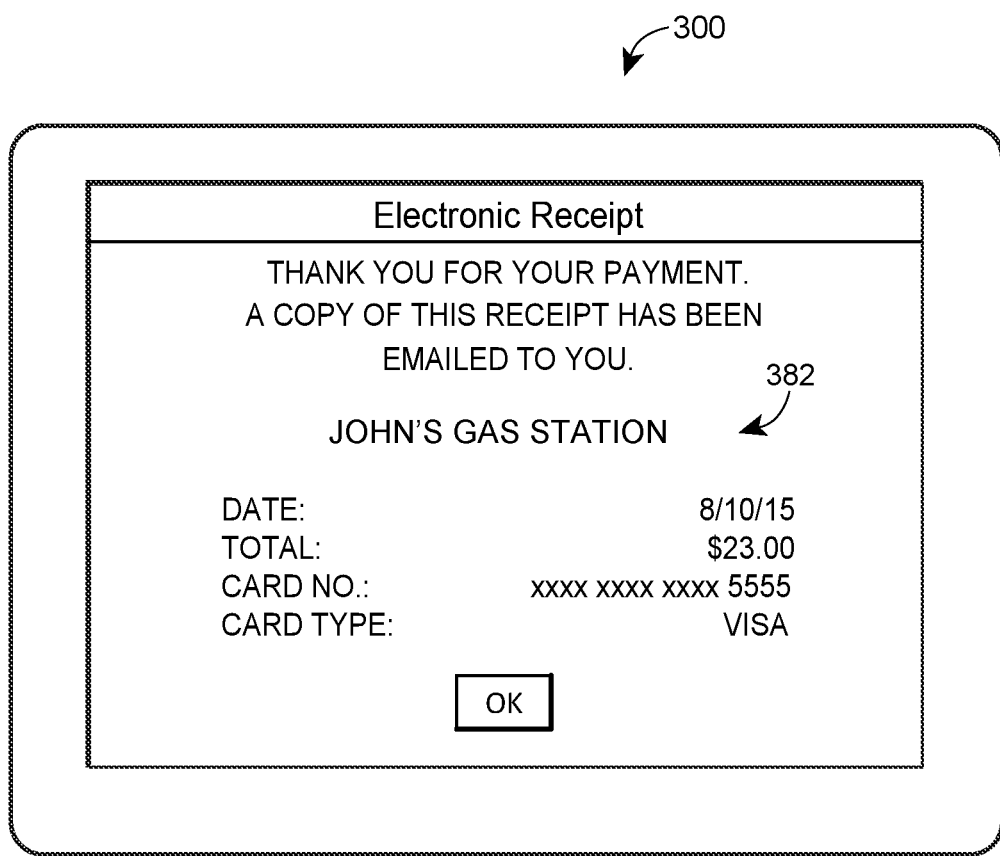
FIG. 3E depicts an exemplary electronic receipt screen of a vehicle payment application in accordance with an exemplary aspect of the present disclosure.

After the user authorizes payment for the goods or services and the payment is accepted, an electronic receipt screen 380 as shown in FIG. 3E may be presented by the vehicle payment application 266. The electronic receipt screen 380 may include information indicative of the payment 382, including the name of the establishment where the goods or services were purchased (John's Gas Station), the date, the total amount paid, the card type, a masked card number, etc. In some embodiments, the electronic receipt may also be sent to the user's portable device 10 or other computing device, via email, short message service (SMS), etc. Additionally, the POS terminal 20 may cause the goods or services purchased to be provided. In the example above, the POS terminal 20 may instruct the robotic/mechanical arm to place the nozzle within the fuel tank opening and provide fuel to the vehicle 12 by opening a smart valve to allow fuel to flow into the fuel tank and closing the smart valve when the fuel tank is full. In another example, the POS terminal 20 may provide instructions to merchant employees to process a food order, deliver dry cleaning, a prescription, etc. More specifically, the POS terminal 20 may determine that a passenger within the vehicle 12 has a prescription that needs to be filled or delivered to the passenger.

IV. Exemplary Flow Diagram for Vehicle Payment System

Figure 4:
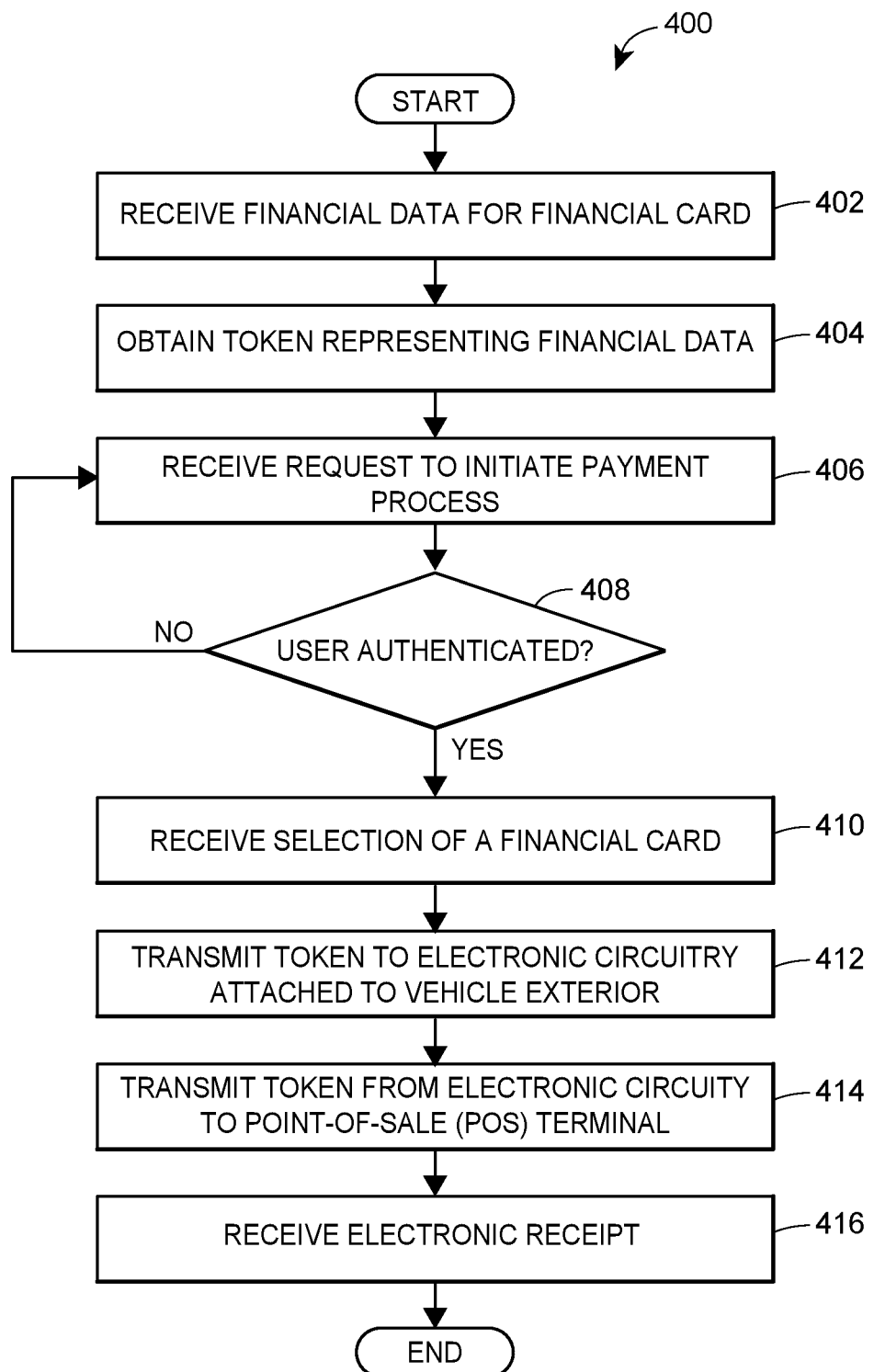
FIG. 4 depicts a flow diagram representing an exemplary method for implementing the vehicle payment system in accordance with an exemplary aspect of the present disclosure.

FIG. 4 depicts a flow diagram representing an exemplary method 400 for using a vehicle as a payment device. The method 400 may be executed on the vehicle head unit 14, the electronic circuitry 50 proximately attached to the exterior of the vehicle, and/or a combination of these devices. In some embodiments, a portion of the method 400 may be implemented in a set of instructions stored on a non-transitory computer-readable memory and executable on one or more processors of the vehicle head unit 14. For example, a portion of the method 400 may be performed by the vehicle payment application 266 of FIG. 2A. Another portion of the method 400 may be implemented in another set of instructions stored on another non-transitory computer-readable memory and executable on one or more processors of the electronic circuitry 50.

At block 402, the vehicle payment application 266 may receive financial data for a financial card or financial account, such as a cardholder name, an expiration date, a card number, and/or a CSC code. For example, a user may select a user control such as an "Add Credit/Debit Card" button on a home screen (not shown) and/or a financial card selection screen of the vehicle payment application 266. The vehicle payment application 266 may then capture an image of the financial card using a camera in the vehicle head unit 14, receive manually entered financial data for the financial card from the user, import the financial card from another application such as a photo library, email application, etc., and/or an external source such as a portable device 10 in communication with the vehicle head unit 14, etc.

The vehicle payment application 266 may obtain a token representing the financial data for the financial card (block 404). In some embodiments, to obtain a token the vehicle payment application 266 may transmit the financial data to a third-party token server 104 as shown in FIG. 1, which may in turn generate and/or store the token with the financial data that the token represents. Moreover, the third-party token server 104 may transmit the token to the vehicle payment application 266.

At block 406, the vehicle payment application 266 may receive a request to initiate a payment process. For example, the user may select a user control from a payment activation screen of the vehicle payment application 266 indicating the user would like to make a payment from her vehicle. In some embodiments, the payment activation screen may be displayed automatically upon detecting the presence of a wireless signal transmitted by a POS terminal 20. In other embodiments, the user may select a vehicle payment application icon to display the payment activation screen.

In any event, the vehicle payment application 266 may authenticate the user to ensure she is authorized to use stored financial cards to make payments (block 408). The vehicle payment application 266 may store biometric information for authorized users, a unique identifier for authorized users, and/or any other suitable information for identifying authorized users. Moreover, the vehicle payment application 266 may request the user to submit a biometric identifier, for example by capturing an image of the user's face and/or by pressing a finger on the display 236 of the vehicle head unit 14. The vehicle payment application 266 may also request the user to enter login information, such as a username and password, a PIN number, etc. When the biometric identifier and/or login information for the user matches the stored biometric information and/or unique identifier for authorized users, the user may be authenticated. Otherwise, the vehicle payment application 266 may continue to receive biometric identifiers and/or login information from the user to find a match.

When the user is authenticated, the vehicle payment application 266 may receive a selection of a financial card (block 410), for example via a financial card selection screen. The financial card selection screen may include indications of one or several financial cards stored at the vehicle payment application 266, and the user may select one of the financial cards displayed on the financial card selection screen.

Upon selecting a financial card and/or authorizing payment using the selected financial card, the vehicle payment application 266 may transmit a token representing the financial data for the financial card to electronic circuitry 50 proximately attached to the exterior of the vehicle 12 (block 412). The token may be transmitted via a first short-range communication link. For example, the vehicle head unit 14 and the electronic circuitry 50 may be paired using Bluetooth, and the data may be transmitted over the Bluetooth communication protocol. In other embodiments, the data may be transmitted over any other suitable short-range communication link, such as Wi-Fi, USB, DSRC, RFID, etc. Also in some embodiments, the vehicle payment application 266 may have transmitted the token for the financial card to the electronic circuitry 50 when the financial card was initially added to the vehicle payment application 266. When the user selects the financial card, the vehicle payment application 266 may transmit an indication of the selected financial card to the electronic circuitry 50.

The electronic circuitry 50 may then transmit the token for the financial card to a POS terminal 20 for making the payment (block 414). The data may be transmitted over a second very short-range communication link, such as NFC, HF RFID, etc. While the method 400 includes transmitting the token for the financial card from the vehicle head unit 14 to the POS terminal 20 via electronic circuitry 50 proximately attached to the exterior of the vehicle, this is merely an exemplary embodiment. In other embodiments, the token may be transmitted directly from the vehicle head unit 14 to the POS terminal 20.

In any event, upon receiving the token, the POS terminal 20 may process the payment from the user. If the payment is accepted, the POS terminal 20 may transmit an electronic receipt (block 416) to be presented on the display 236 of the vehicle head unit 14. Additionally, the electronic receipt may be transmitted to a portable device 10 of the user via email, SMS, etc. On the other hand, if the payment is declined, the POS terminal 20 may transmit a message to be presented on the display 236 of the vehicle head unit 14 indicating that the selected financial card has been declined and/or to select a different method of payment. The method may include additional, fewer, or alternative actions, including those discussed elsewhere herein.

V. Exemplary Method For Using A Vehicle As A Payment Device

In one aspect, a computer-implemented method for using a vehicle as a payment device may be provided. The method may include: (1) receiving (via one or more processors and/or associated transceivers in a head unit of a vehicle) one or more sets of financial data each corresponding to a financial account for making payments; for each of the one or more sets of financial data; (2) obtaining (via the one or more processors and/or associated transceivers) a token representing the set of financial data; and/or in response to receiving an indication from a user within the vehicle that the user wants to initiate a payment process; (3) authenticating (via the one or more processors) the user to ensure the user is authorized to use the one or more or financial accounts for making payments by receiving and verifying authentication information from the user. Upon authenticating the user, the method may further include: (4) receiving (via the one or more processors and/or associated transceivers) a selection by the user of one of the one or more financial accounts; (5) transmitting (via the one or more processors and/or associated transceivers, and/or a first wired or wireless communication and/or data transmission over a radio link or wireless communication channel) an indication of the selected financial account to an electronic device proximately attached to an exterior of the vehicle; and/or (6) transmitting (via the electronic device (and/or associated transceiver) proximately attached to the exterior of the vehicle and/or a second wired or wireless communication and/or data transmission) a token corresponding to the selected financial account to a point-of-sale (POS) terminal to purchase goods or services associated with the POS terminal from the vehicle using the selected financial account. The method may include additional, fewer, or alternative actions, including those discussed elsewhere herein.

For instance, the electronic device may be attached to a fuel tank cap of the vehicle, the POS terminal may be associated with a fuel station, and the method may include transmitting (via the one or more processors) a request to the electronic device to open the fuel tank cap; and/or in response to receiving the request, automatically causing (via the one or more electronic device) the fuel tank cap to open for receiving fuel.

Moreover, the fuel station may include a fuel pump having a robotic arm for automatically pumping fuel into a fuel tank of the vehicle, and the method may include in response to automatically causing the fuel tank cap to open, transmitting (via the electronic device) an indication to the fuel pump to insert the fuel into the fuel tank;

Furthermore, the electronic device may be communicatively coupled to a fuel level sensor, and the method may include measuring (via the electronic device via the fuel level sensor) a change in an amount of fuel within a fuel tank of the vehicle; receiving (via the electronic device) an indication of a payment amount for purchasing the fuel; comparing (via the electronic device) an estimated cost for the fuel based upon the change in the amount of fuel to the payment amount; and/or when the estimated cost for the fuel and the payment amount differ by more than a threshold amount, transmitting (via the electronic device to the one or more processors and/or a first wired or wireless communication and/or data transmission) an indication to display a recommendation not to authorize the purchase.

Additionally, the method may include displaying (via the one or more processors on the head unit of the vehicle) a payment amount and a request for the user to authorize payment for the fuel; transmitting (via the electronic device and/or a second wired or wireless communication and/or data transmission) an indication to the POS terminal that the payment is authorized; and/or displaying (via the one or more processors on the head unit of the vehicle) an electronic receipt for the purchase.

The method may also include obtaining (via the one or more processors) user preferences indicating retailers, services, or goods which the user prefers; determining (via the one or more processors) that the user is within a threshold distance of a point of interest (POI) that corresponds to the user preferences, wherein the POI has a POS terminal configured to communicate with the vehicle; and/or receiving (via the one or more processors) a notification that the user is within the threshold distance of the POI.

Still further, the method may include receiving (via the one or more processors and/or associated transceivers) a payment amount from the POS terminal; and/or displaying (via the one or more processors) the payment amount and a user control for selecting one of the one or more financial accounts on the head unit of the vehicle.

The act of authenticating the user to ensure the user is authorized to use the one or more financial accounts may include receiving (via the one or more processors and/or associated transceivers) at least one of: (i) user login information, or (ii) user biometric information; comparing (via the one or more processors) the at least one user login information or user biometric information to stored user login information or user biometric information; and/or authenticating the user when there is a match. The act of obtaining a token representing the set of financial data may include transmitting (via the one or more processors and/or a first wired or wireless communication and/or data transmission) the set of financial data to a third-party token server; and/or receiving (via the one or more processors and/or transceivers, and/or a first wired or wireless communication and/or data transmission) a token representing the set of financial data from the third-party token server, wherein the third-party token server stores the token and the set of financial data.

VI. Exemplary System for Using a Vehicle as a Payment Device

In one aspect, a system for using a vehicle as a payment device may be provided. The system may include one or more processors and/or associated transceivers in a head unit of a vehicle, an electronic device proximately attached to an exterior of the vehicle, and/or a non-transitory computer-readable memory coupled to the one or more processors and storing machine readable instructions, that when executed by the one or more processors, may cause the system to perform various tasks. For example, the instructions may cause the system to: (1) receive one or more sets of financial data each corresponding to a financial account for making payments; for each of the one or more sets of financial data; (2) obtain a token representing the set of financial data; and/or in response to receiving an indication from a user within the vehicle that the user wants to initiate a payment process; (3) authenticate the user to ensure the user is authorized to use the one or more financial accounts for making payments by receiving and verifying authentication information from the user. Upon authenticating the user, the instructions may further cause the system to: (4) receive a selection by the user of one of the one or more financial accounts; and/or (5) transmit via a first short-range communication link, an indication of the selected financial account to the electronic device proximately attached to the exterior of the vehicle. In response to receiving the indication of the selected financial account, the electronic device may be configured to: (6) transmit, via a second very short-range communication link, a token corresponding to the selected financial account to a point-of-sale (POS) terminal to purchase goods or services associated with the POS terminal from the vehicle using the selected financial account. The system may include additional, fewer, or alternate components and/or functionality, including that discussed elsewhere herein.

For instance, the electronic device may be attached to a fuel tank cap of the vehicle, the POS terminal may be associated with a fuel station, and the instructions may cause the system to transmit a request to the electronic device to open the fuel tank cap; and/or in response to receiving the request, the electronic device may be configured to automatically cause the fuel tank cap to open for receiving fuel. Further, the electronic device may be communicatively coupled to a fuel level sensor, and the electronic device may be further configured to measure, via the fuel level sensor, a change in an amount of fuel within a fuel tank of the vehicle; receive an indication of a payment amount for purchasing the fuel; compare an estimated cost for the fuel based upon the change in the amount of fuel to the payment amount; and/or when the estimated cost for the fuel and the payment amount differ by more than a threshold amount, transmit to the one or more processors; an indication to display a recommendation not to authorize the purchase.

Moreover, the fuel station may include a fuel pump having a robotic arm for automatically pumping fuel into a fuel tank electronic device may be configured to transmit an indication to the fuel pump to insert the fuel into the fuel tank.

Additionally, the instructions may cause the system to display, on the head unit of the vehicle, a payment amount and a request for the user to authorize payment for the fuel; the electronic device may be configured to transmit an indication to the POS terminal that the payment is authorized; and/or the instructions may cause the system to display, on the head unit of the vehicle, an electronic receipt for the purchase.

Furthermore, the instructions may cause the system to obtain user preferences indicating retailers, services, or goods which the user prefers; determine that the user is within a threshold distance of a point of interest (POI) that corresponds to the user preferences, wherein the POI has a POS terminal configured to communicate with the vehicle; and/or receive a notification that the user is within the threshold distance of the POI. In addition, the instructions may cause the system to receive a payment amount from the POS terminal; and/or display the payment amount and a user control for selecting one of the one or more financial accounts on the head unit of the vehicle.

To authenticate the user to ensure the user is authorized to use the one or more financial accounts, the instructions may cause the system to receive at least one of: (i) user login information, or (ii) user biometric information; compare the at least one user login information or user biometric information to stored user login information or user biometric information; and/or authenticate the user when there is a match. To obtain a token representing the set of financial data, the instructions may cause the system to transmit the set of financial data to a third-party token server; and/or receive a token representing the set of financial data from the third-party token server, wherein the third-party token server stores the token and the set of financial data.

VII. Exemplary Communication Flow for Vehicle Payments

Figure 5:
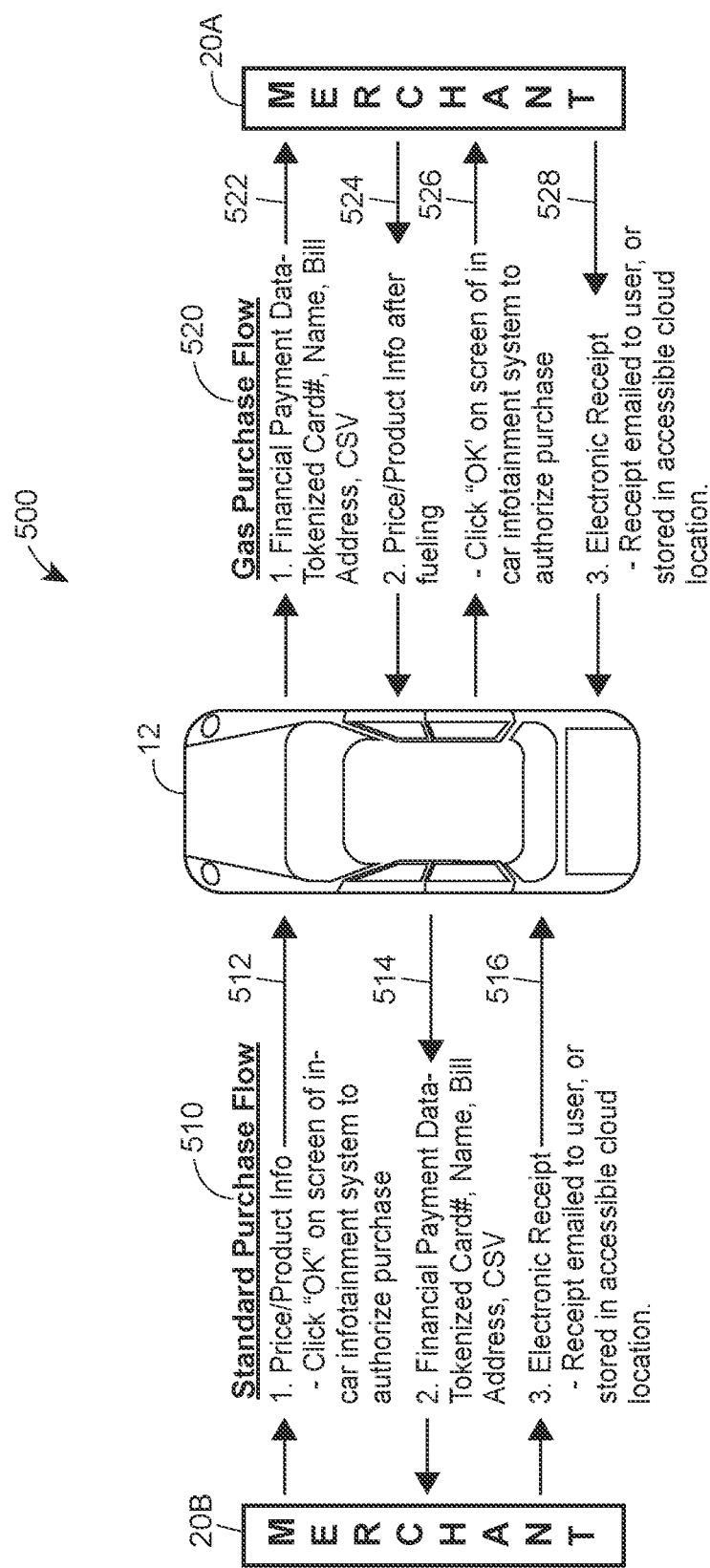
FIG. 5 depicts a connected vehicle configured for use as a payment device in accordance with an exemplary aspect of the present disclosure.

FIG. 5 depicts a connected vehicle 12 configured for use as a payment device, and an exemplary wireless communication flow 500 from a connected vehicle to various merchants having merchant communication terminals configured to accept vehicle pay. Virtual vehicle pay (or vehicle payments) may be used to purchase various goods, such as fast food, dry cleaning, coffee, tolls, car washes, drive thru pharmacy, emergency room services, and/or routine vehicle maintenance.

As shown, a standard purchase flow 510 may include (1) presenting price and/or product information 512, such as on a vehicle central console, vehicle navigation unit, or infotainment system. The price/product information may be transmitted to the vehicle from a merchant communication terminal or server via wireless communication and/or data transmission over a radio frequency link. In one embodiment, the price and/or product information may be transmitted over a short-range wireless communication channel. After which, a driver or passenger may click or touch an "OK" or other icon on a display screen of a vehicle infotainment system or the like to authorize purchase.

The standard purchase flow 510 may include (2) transmitting financial payment data 514 from the vehicle to the merchant communication terminal or server. The financial payment data may include information related to the name of the driver or passenger, their billing address, CSV, a tokenized card number (such as a credit or debit card), and/or one or more tokens or encryption or other keys used to facilitate secure financial transactions.

The standard purchase flow 510 may include (3) providing an electronic receipt 516 for goods or services purchased via the vehicle payment. The receipt may be emailed to the driver or passenger's mobile device, or stored in a cloud location accessible by the vehicle or a mobile device.

Also shown in FIG. 5 is an exemplary gas purchase flow 520. The gas purchase flow 520 may include (1) sending or transmitting financial payment data 522 to a merchant or gas station communication terminal or server via wireless communication or data transmission over a radio frequency link. In one embodiment, a short-range wireless communication channel may be used. The financial payment data may include a tokenized card number, name, billing address, CSV, and/or tokens or encryption keys to enable secure financial transactions.

The gas purchase flow 520 may include (2) the merchant or gas station communication terminal or server transmitting price and/or product information 524 before and/or after fueling the vehicle. The price/product information may include price per gallon of gasoline and/or number of gallons to be purchased, or that have already been pumped. The price and/or product information may be transmitted over the short-range wireless communication channel.

The gas purchase flow 520 may include (3) the driver or passenger being presented with the price and/or product information 526, such as via a display of a vehicle infotainment system, vehicle navigation system, or central control console. After the user touches an "OK" icon or the like, the vehicle may transmit, such as over the short-range wireless communication channel, an authorization to the gas station communication terminal to charge an amount indicated to pay for the gasoline purchased.

The gas purchase flow 520 may include (4) the gas station communication terminal or server transmitting an electronic receipt 528 detailing the purchase of gasoline. The receipt may be, for example, emailed to the user's mobile device, to the vehicle, or sent to a mail box located or accessible via the cloud.

In one embodiment, the driver or passenger financial information (or an account associated with the vehicle itself) (or even driver or passenger biometric data stored in database, with the driver's or passenger's permission or affirmative consent) may be required to be received and verified by the gas station communication terminal, such as a "smart" gas pump, before the smart gas pump will be activated, or otherwise pump or transfer gasoline to the vehicle's gas tank.

In another embodiment, upon entering the vehicle, the driver or passenger may be authenticated by one or more of the following: PIN, voice recognition, facial scan, finger print scan, retina scan, authenticated key fob, presence and/or identification of a mobile device (e.g., smart phone, smart watch, or wearable electronics). The data may be transmitted from the vehicle to a merchant computer or terminal by RFID, DSRC powered signals, Bluetooth low energy, or Wi-Fi signals. The primary driver interface may be the infotainment system of the vehicle, vehicle navigation system, and/or an autonomous vehicle controller or control system, for examples.

Additional features may include the ability of the vehicle communication system/controller to cap spending for each user, each user account, and/or a vehicle account (such as virtual account established for an autonomous vehicle to insure that the autonomous vehicle has access to, or is authorized a certain amount of monies to pay for gasoline or vehicle maintenance). For instance, a parent may cap a teen's account at a given level. Payment methods may include the use of toggle buttons.

A link to merchant loyalty reward programs may be associated with the various user or vehicle financial accounts used. Other links may be provided, such as links to insurance provider accounts, banking or debit accounts, and/or links to provide medical insurance or health insurance provider and account information upon a visit to a doctor, hospital, clinic, or emergency room.

VIII. Exemplary Vehicle Payment Embodiments

Figure 6:
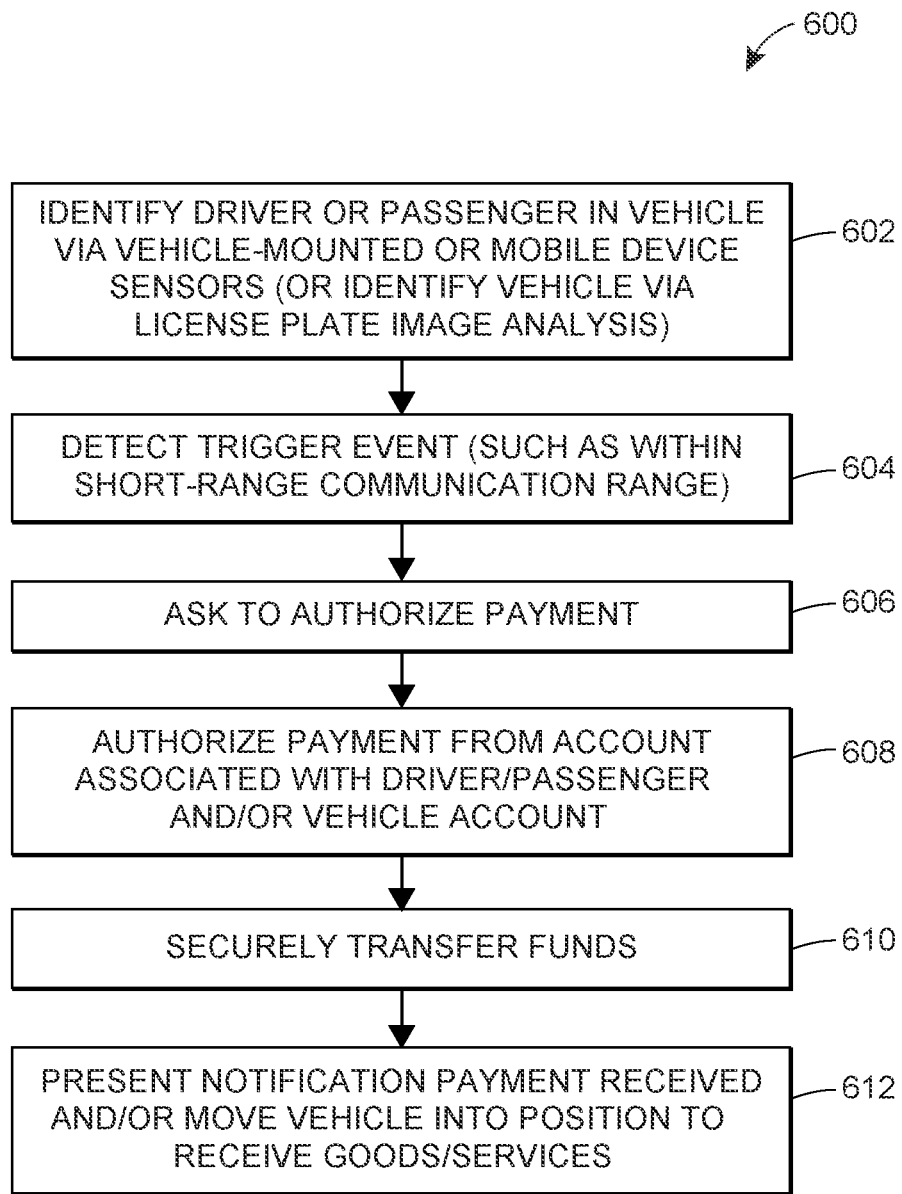
FIG. 6 depicts a flow diagram representing an exemplary method for using a connected (or smart) vehicle as an electronic payment device in accordance with an exemplary aspect of the present disclosure.

FIG. 6 depicts an exemplary computer-implemented method of using a connected (or smart) vehicle as an electronic payment device 600. The method 600 may include (1) identifying or determining, via one or more (vehicle-mounted, mobile device, or other) processors and/or biometric sensors, an identification of a driver or passenger within a vehicle 602; (2) detecting, via the one or more processors and/or transceivers, a triggering event (such as the vehicle being within short-range (and/or low energy) communication range with a merchant communication terminal) 604; (3) presenting, via the one or more processors, a display asking the driver or passenger if they would like to authorize payment from a virtual account for nearby goods or services associated with a merchant, the virtual account associated with, or linked with, the driver or passenger identified (and/or the vehicle) 606; (4) accepting, via the one or more processors, an input from the driver or passenger authorizing payment for the goods or services from the virtual account 608; (5) securely, via the one or more processors and/or transceivers, transferring funds from the virtual account to a merchant's virtual account (via wireless communication with the merchant communication terminal over a short-range communication channel) 610; and/or (6) accepting, via the one or more processors, the goods or services, and/or presenting a notification that payment for the goods or services has been accepted 612 to facilitate the vehicle acting as an payment device for a commercial transaction.

In another aspect, a computer-implemented method of using a connected vehicle as an electronic payment device may be provided. The method may include (1) identifying or determining, via one or more processors and/or sensors, an identification of a connected vehicle (such as via object recognition performed on license plate digital images of the vehicle); (2) detecting, via the one or more processors and/or transceivers, a triggering event (such as the vehicle being within short-range communication range with a merchant communication terminal); (3) presenting, via the one or more processors, a display asking a driver or passenger of the vehicle if they would like to authorize payment from a virtual account for nearby goods or services provided by a merchant, the virtual account associated with, or linked with, the vehicle identified; (4) accepting, via the one or more processors, an input from the driver or passenger authorizing payment for the goods or services; (5) securely, via the one or more processors and/or transceivers, transferring funds from the virtual account to a merchant's virtual account (via wireless communication with the merchant communication terminal over a short-range communication channel); and/or (6) accepting, via the one or more processors, the goods or services, or presenting a notification that payment for the goods or services has been accepted to facilitate the vehicle acting as an payment device for a commercial transaction.

Figure 7:
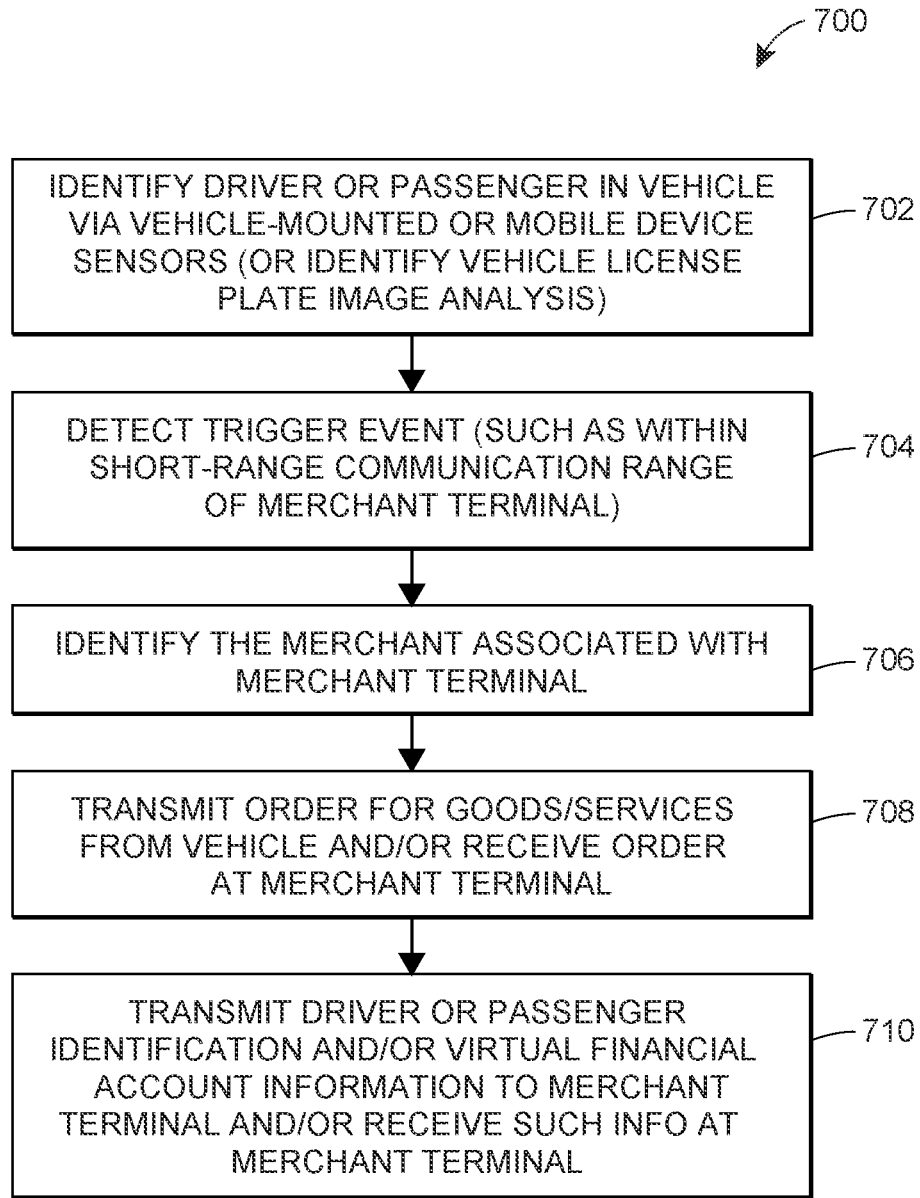
FIG. 7 depicts a flow diagram representing another exemplary method for using a connected (or smart) vehicle as an electronic payment device in accordance with an exemplary aspect of the present disclosure.

FIG. 7 depicts another exemplary computer-implemented method of using a connected vehicle as an electronic payment device 700. The method 700 may include (1) identifying or determining, via one or more (vehicle-mounted) processors and/or biometric sensors, an identification of a driver or passenger within a vehicle 702; (2) detecting, via the one or more processors and/or transceivers, a triggering event (indicating that a merchant communication terminal is in short-range (and/or low energy) wireless communication or data transmission range with the one or more processors and/or transceivers) 704; (3) identifying, via the one or more processors and/or transceivers, a merchant associated the merchant communication terminal 706; (4) transmitting, via the one or more processors and/or transceivers, an order for goods or services from the merchant to the merchant communication terminal via a short-range wireless communication or data transmission channel 708; and/or (5) transmitting, via the one or more processors and/or transceivers, the identification of the driver or passenger, and/or a virtual financial account of the driver or passenger to the merchant communication terminal via the short-range wireless communication or data transmission channel 710 to facilitate secure vehicle payment of goods or services.

In another aspect, a computer-implemented method of using a connected vehicle as an electronic payment device may be provided. The method may include (1) identifying or determining, via one or more (vehicle-mounted or merchant communication-mounted) processors and/or sensors, an identification of a driver or passenger within a vehicle and/or an identification of a connected vehicle (such as via object recognition techniques performed on digital images of the vehicle identifying the vehicle license plate); (2) detecting, via the one or more (vehicle-mounted or merchant communication-mounted) processors and/or transceivers, a triggering event (indicating that a merchant communication terminal is in short-range wireless communication or data transmission range with the connected vehicle and/or the one or more vehicle-mounted processors and/or transceivers); (3) identifying, via the one or more (vehicle-mounted) processors and/or transceivers, a merchant associated the merchant communication terminal, or transmitting an identification of the merchant from the merchant communication terminal to the connected vehicle; (4) transmitting, via the one or more (vehicle-mounted) processors and/or transceivers, an order for goods or services provided by the merchant to the merchant communication terminal via a short-range wireless communication or data transmission channel, or receiving, via the (merchant communication terminal) processors and/or transceivers the order for goods or services from the connected vehicle; and/or (5) transmitting, via the one or more (vehicle-mounted) processors and/or transceivers, the identification of the driver or passenger (and/or vehicle), and/or a virtual financial account of the driver or passenger (and/or vehicle) to the merchant communication terminal via the short-range wireless communication or data transmission channel, or receiving, via the (merchant communication terminal) processors and/or transceivers the identification of the driver or passenger (and/or vehicle), and/or a virtual financial account of the driver or passenger (and/or vehicle) to facilitate secure vehicle payment of goods or services.

The foregoing methods may include additional, less, or alternate actions, including those discussed elsewhere herein. The foregoing methods may be implemented via one or more local or remote processors, sensors, and/or transceivers, and/or via computer-executable instructions stored on non-transitory computer-readable medium or media.

For instance, the one or more processors and/or biometric sensors may employ or use a PIN number, voice or facial recognition techniques, facial scan, finger print scan, retina scan, authenticated key fob, smart phone or mobile device recognition techniques, and/or weight or pressure sensors to identify or verify the driver or passenger within the vehicle.

The triggering event may include detecting, via the one or more processors, that the vehicle is within direct communication range of a merchant's smart terminal, sensor, processor, server, or transceiver, such as within Wi-Fi, RFID, or Bluetooth short-range wireless communication range. The triggering event may include detecting, via the one or more processors, that the vehicle is within a predetermined distance of a smart gas pump, such as by comparison of the vehicle's current GPS location with a predetermined GPS location of a gas station, and the goods or services is gasoline. The triggering event may include detecting, via the one or more processors, that the vehicle is within a predetermined distance of a merchant's smart communication terminal, such as by comparison of the vehicle's GPS location with the GPS location of the merchant, and the goods or services is food, dry cleaning, coffee, groceries, pharmaceuticals, and/or vehicle maintenance. The triggering event may include detecting, via the one or more processors, that the vehicle is within a predetermined distance of a merchant's smart communication terminal, such as by using a camera, digital image analysis, a radar unit's images or data, infrared sensor data, 3D data, and/or other sensor data. Additionally or alternatively, the triggering event may include detecting, via the one or more processors, that the vehicle is within a predetermined distance of a merchant's smart communication terminal, such as by using a camera and digital image analysis (such as object recognition or optical character recognition) techniques. Other triggering events may be used.

The vehicle may be a self-driving or autonomous vehicle that directs itself to, and/or about, the merchant's physical location or parking lot, and/or positions itself to receive the goods or services. For instance, an autonomous vehicle may drive itself to the "drive-thru" at a fast food place, or to a gas pump of a gas station.

The method may include building a list of preferred merchants or merchant locations for the driver or passenger, the preferred merchants or merchant locations allowing for, or configured to accept, vehicle payments. The trigger event may also include determining that the merchant or merchant location is on the list of preferred merchants or merchant locations before allowing secure wireless communication with a merchant communication terminal. For example, after detecting one of the trigger event mentioned herein, the method may further include verifying that the merchant's communication terminal is associated with a merchant or merchant location listed, or included within a list of preferred merchants or merchant locations for the driver or passenger identified using biometric or other data.

In one aspect, a computer system configured to use a connected vehicle as an electronic payment device may be provided. The computer system may include one or more (vehicle-mounted) processors, sensors, biometric sensors, and/or transceivers configured to: (1) identify a driver or passenger within a vehicle, such as by mobile device print or ID, or via biometric data; (2) detect a triggering event, such as the vehicle being within short-range communication range of the merchant; (3) present a display asking the driver or passenger if they would like to authorize payment from a virtual account for nearby goods or services, the virtual account associated with, or linked with, the driver or passenger, or vehicle; (4) accept an input from the driver or passenger authorizing payment for the goods or services; (5) securely transfer funds from the virtual account to a merchant's virtual account or merchant communication terminal (such as via wireless communication or data transmission over a short-range wireless communication channel); and/or (6) accept the goods or services, or move the vehicle in proximity to the goods or services (such as automatically drive an autonomous vehicle to a drive-thru window or up to a gas pump), to facilitate the vehicle acting as an payment device.

In another aspect, a computer system configured to use a connected vehicle as an electronic payment device may be provided. The computer system may include one or more (merchant communication terminal-mounted) processors, sensors, biometric sensors, and/or transceivers configured to: (1) identify an autonomous or other vehicle, such as by license plate scan; (2) detect a triggering event; (3) transmit a message asking the driver or passenger of the vehicle if they would like to authorize payment from a virtual account for nearby goods or services, the virtual account associated with, or linked with, the driver or passenger, and/or the autonomous or other vehicle (such as via wireless communication or data transmission over a short-range wireless communication channel); (4) receive an electronic response from the driver or passenger authorizing payment for the goods or services (such as via wireless communication or data transmission over a short-range wireless communication channel); (5) securely transferring funds from the virtual account to a merchant's virtual account or merchant communication terminal (such as via wireless communication or data transmission over a short-range wireless communication channel); and/or (6) delivering the goods or services into or in proximity the connected vehicle to facilitate the vehicle acting as an payment device.

In another aspect, a computer system configured to facilitate using a connected vehicle as an electronic payment device may be provided. The computer system may include one or more vehicle-mounted processors, biometric or other sensors, and/or transceivers configured to: (1) identify a driver or passenger within a vehicle (such as by using biometric sensor or mobile device sensor data); (2) detect a triggering event (indicating that a merchant communication terminal is in short-range wireless communication or data transmission range with the one or more processors and/or transceivers); (3) identify a merchant associated the merchant communication terminal; (4) transmit an order for goods or services from the merchant to the merchant communication terminal via a short-range wireless communication or data transmission channel); and/or (5) transmit the identification of the driver or passenger, and/or a virtual financial account of the driver or passenger to the merchant communication terminal via the short-range wireless communication or data transmission channel to facilitate secure vehicle payment of goods or services.

The foregoing computer systems may include additional, less, or alternate functionality including that discussed elsewhere herein. For instance, the one or more processors and/or biometric sensors employ or use a PIN number, voice or facial recognition techniques, facial scan, finger print scan, retina scan, authenticated key fob, smart phone or mobile device recognition techniques, and/or weight or pressure sensors to identify or verify the driver or passenger within the vehicle.

IX. Additional Exemplary Vehicle Payment Embodiments

Figure 8:
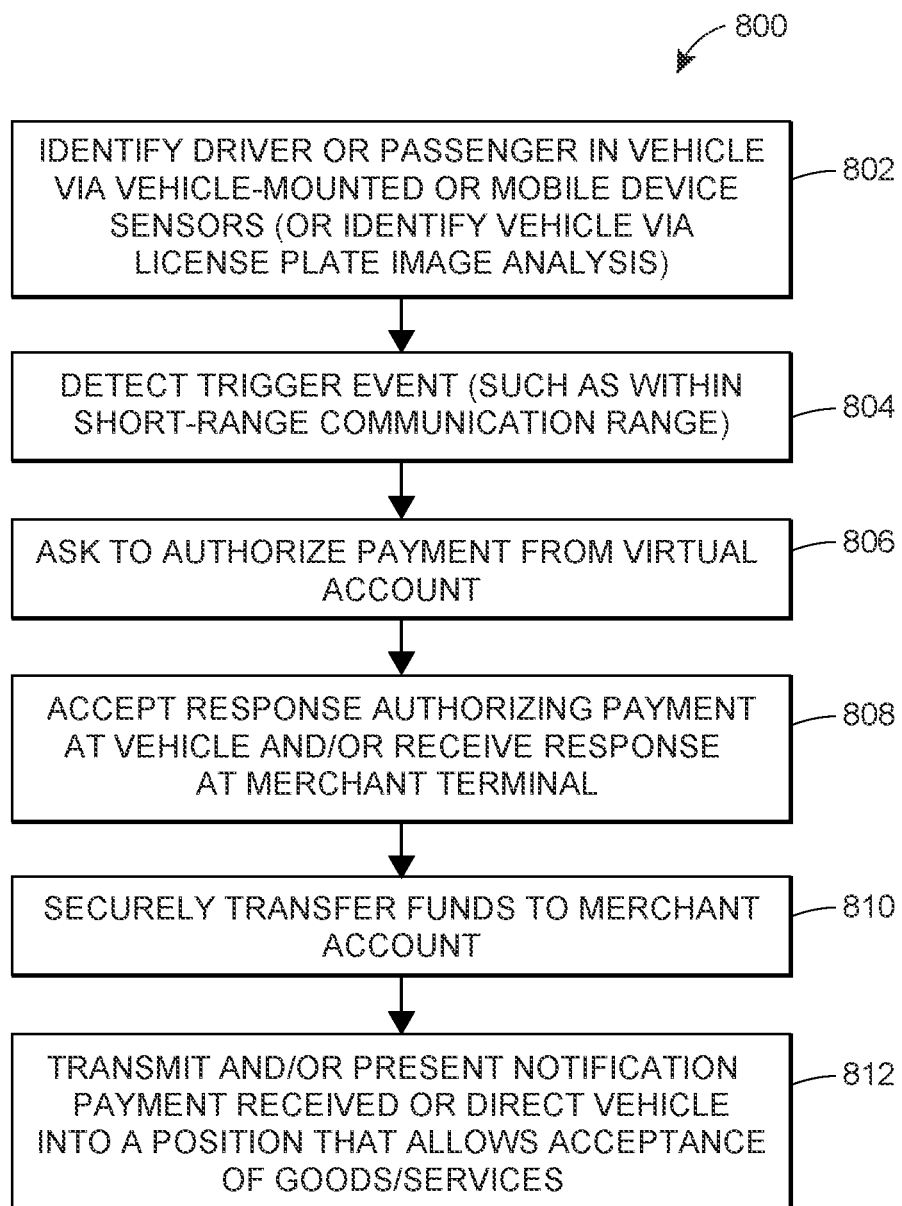
FIG. 8 depicts a flow diagram representing yet another exemplary method for using a connected (or smart) vehicle as an electronic payment device in accordance with an exemplary aspect of the present disclosure.

FIG. 8 depicts another exemplary computer-implemented method of using a connected vehicle as an electronic payment device 800. The method 800 may include (1) identifying, via one or more (vehicle-mounted) processors and/or biometric sensors, an identification of a driver or passenger within an autonomous or other vehicle, the one or more biometric sensors recognizing a person's voice, image, finger print, weight, etc. 802; (2) detecting, via the one or more processors and/or transceivers, a triggering event, the triggering event including the autonomous or other vehicle being (i) within a predetermined distance of a merchant transceiver or server, and/or (ii) within direct wireless communication or data transmission with the merchant transceiver or server (such as direct RFID, Wi-Fi, or Bluetooth wireless communication, e.g., within a pre-determined short range distance, such as 5 feet, 8-10 feet, 10-25 feet, or 10-50 feet) 804; (3) presenting, via the one or more processors, a display asking the driver or passenger if they would like to authorize payment from a virtual account for nearby goods or services, or audibly asking the driver or passenger if they would like to authorize payment from the virtual account for the nearby goods or services, the virtual account associated with, or linked with, the driver or passenger identification and/or the vehicle (or a vehicle identification) 806; (4) accepting, via the one or more processors, an input (or manual, visible, or audible) response from the driver or passenger authorizing payment for the goods or services 808; (5) securely, via the one or more processors, electronically transferring funds from the virtual account to a merchant's virtual account to pay for the goods or services 810; and/or (6) accepting, via the one or more processors, the goods or services, or automatically or otherwise directing the vehicle to move in proximity of the goods or services (such as a window or gas pump) to receive them 812, to facilitate the vehicle acting as an payment device. The method may include additional, less, or alternate actions, including those discussed elsewhere herein, and/or may be implemented via one or more local or remote processors, sensors, and/or transceivers.

For instance, the goods or services may be offered by a road-side merchant, such as gas station, vehicle repair shop, bank, fast food or other restaurant, grocery store, pharmacy, coffee shop, dry cleaners, etc. The goods or services offered may be gasoline, and the gas station may be equipped with a smart gas pump that automatically fills up the gas tank of the autonomous or other vehicle. For instance, the gas station may be equipped with a smart gas pump that automatically fills up the gas tank of the autonomous or other vehicle when it is detected by one or more sensors that the autonomous or other vehicle has stopped, and/or is close enough to, or within range of, the smart gas pump. Additionally or alternatively, the gas station may be equipped with a smart gas pump that automatically fills up the gas tank of the autonomous or other vehicle, such as by extending an automated or mechanical arm attached to a nozzle, the automated or mechanical arm extends the nozzle into the gas tank opening of the autonomous or other vehicle.

The vehicle may be a self-driving or autonomous vehicle that directs itself to, and/or about, the merchant's physical location or parking lot, and/or positions itself to receive the goods or services. The method may include building a list of preferred merchants or merchant locations for the driver or passenger (and/or vehicle), the preferred merchants or merchant locations allowing for, or configured to accept, vehicle payments. The trigger event may include, solely or in combination with other events detected, determining that the merchant or merchant location is on the list of preferred merchants or merchant locations before allowing secure wireless communication with a merchant communication terminal.

In another aspect, a computer system configured to facilitate using a connected vehicle as an electronic payment device may be provided. The computer system may include one or more vehicle-mounted processors, biometric or other sensors, and/or transceivers configured to: (1) identify an identification of a driver or passenger within an autonomous or other vehicle, the one or more biometric sensors recognizing a person's voice, image, finger print, weight, height, etc.; (2) detect a triggering event, the triggering event including the autonomous or other vehicle being (i) within a predetermined distance of a merchant transceiver or server, and/or (ii) within direct wireless communication or data transmission with the merchant transceiver or server (such as direct RFID, Wi-Fi, or Bluetooth wireless communication, e.g., within a pre-determined short range distance, such as within 8-10 feet); (3) present a display asking the driver or passenger if they would like to authorize payment from a virtual account for nearby goods or services, or audibly ask the driver or passenger if they would like to authorize payment from the virtual account for the nearby goods or services, the virtual account associated with, or linked with, the driver or passenger identification and/or the vehicle (or a vehicle identification); (4) accept an input (or manual, visible, or audible) response from the driver or passenger authorizing payment for the goods or services; (5) securely electronically transfer funds from the virtual account to a merchant's virtual account to pay for the goods or services; and/or (6) accept the goods or services, or automatically or otherwise direct the (autonomous or other) vehicle to move in proximity of the goods or services to receive them, to facilitate the vehicle acting as an payment device. The computer system may include additional, less, or alternate functionality, including that discussed elsewhere herein.

In yet another aspect, a computer-implemented method of using a connected vehicle as an electronic payment device may be provided. The method may include: (1) obtaining (via one or more processors) identification information for a user within a vehicle or for the vehicle; authenticating (via the one or more processors) the user or the vehicle based upon the identification information to ensure the user or the vehicle is authorized to use a virtual account for purchasing goods or services; and/or (3) detecting (via the one or more processors) a triggering event indicating that the vehicle is within a predetermined range for communicating with a merchant communication terminal of a merchant. The method may further include (4) presenting (via the one or more processors) a display including an indication of goods or services that can be purchased at the merchant communication terminal and a user control for transmitting a request to order the goods or services to the merchant communication terminal; and/or in response to receiving a selection of the user control: (5) transmitting (via the one or more processors and/or a wired or wireless communication and/or data transmission) the request to order the goods or services to the merchant communication terminal; and/or (6) securely transferring (via the one or more processors and/or a wired or wireless communication and/or data transmission) funds from the virtual account to a virtual account of the merchant to facilitate secure vehicle payment of goods and services.

The foregoing methods may include additional, less, or alternate actions, including those discussed elsewhere herein. The foregoing methods may be implemented via one or more local or remote processors, sensors, and/or transceivers, and/or via computer-executable instructions stored on non-transitory computer-readable medium or media.

For instance, the identification information may include a PIN number, a facial scan, a finger print scan, a retina scan, a voice scan, an authenticated key fob, mobile device identification information, sensor data from weight or pressure sensors within the vehicle which detect a weight of a driver or passenger within the vehicle, or a license plate number for the vehicle.

The triggering event may include at least one of: (1) detecting, by the one or more processors, that the vehicle is within Wi-Fi, Radio Frequency Identification (RFID), or Bluetooth communication range of the merchant communication terminal by receiving a Wi-Fi, RFID, or Bluetooth signal from the merchant communication terminal; (2) detecting, by the one or more processors, that the vehicle is within a predetermined distance of the merchant communication terminal by comparing a current location of the vehicle to the location of the merchant communication terminal; and/or (3) detecting, by the one or more processors, that the vehicle is within a predetermined distance of the merchant communication terminal by capturing images, via a camera within the vehicle, of an area surrounding the vehicle, and identifying, using digital image analysis techniques, the merchant communication terminal within at least one of the images and a position of the merchant communication terminal relative to the vehicle.

The goods or services provided by the merchant may include at least one of: gasoline, food, dry cleaning, coffee, groceries, pharmaceuticals, or vehicle maintenance. The merchant may be at least one of: a gas station, a vehicle repair shop, a bank, a fast food or other restaurant, a grocery store, a pharmacy, a coffee shop, or a dry cleaners.

The vehicle may be an autonomous vehicle which automatically navigates to the merchant communication terminal and further navigates to a position relative to the merchant communication terminal for receiving the goods or services from the merchant.

The merchant may be a gas station and the user control for transmitting a request to order the goods or services may further transmit an authorization of payment from the virtual account associated with the vehicle.

The method may further include generating (via the one or more processors) a list of preferred merchants for the user that accept vehicle payments, wherein detecting a triggering event may include determining (via the one or more processors) that the detected merchant communication terminal is for a merchant that is on the list of preferred merchants before communicating with the merchant communication terminal.

In another aspect, a computer system configured to use a connected vehicle as an electronic payment device may be provided. The computer system may include one or more processors, transceivers, and/or sensors configured to: (1) obtain identification information for a user within a vehicle or for the vehicle; (2) authenticate the user or the vehicle based upon the identification information to ensure the user or the vehicle is authorized to use a virtual account for purchasing goods or services; and/or (3) detect a triggering event indicating that the vehicle is within a predetermined range for communicating with a merchant communication terminal of a merchant. The computer system may be further configured to: (4) present a display including an indication of goods or services that can be purchased at the merchant communication terminal and a user control for transmitting a request to order the goods or services to the merchant communication terminal; and/or in response to receiving a selection of the user control: (5) transmit the request to order the goods or services to the merchant communication terminal; and/or (6) securely transfer, via a short-range communication link, funds from the virtual account to a virtual account of the merchant to facilitate secure vehicle payment of goods and services. The computer system may include additional, fewer, or alternate components and/or functionality, including that may be discussed elsewhere herein.

For instance, the identification information may include a PIN number, a facial scan, a finger print scan, a retina scan, a voice scan, an authenticated key fob, mobile device identification information, sensor data from weight or pressure sensors within the vehicle which detect a weight of a driver or passenger within the vehicle, or a license plate number for the vehicle.

The triggering event may include at least one of: (1) detecting that the vehicle is within Wi-Fi, Radio Frequency Identification (RFID), or Bluetooth communication range of the merchant communication terminal by receiving a Wi-Fi, RFID, or Bluetooth signal from the merchant communication terminal; (2) detecting that the vehicle is within a predetermined distance of the merchant communication terminal by comparing a current location of the vehicle to the location of the merchant communication terminal; and/or (3) detecting that the vehicle is within a predetermined distance of the merchant communication terminal by capturing images, via a camera within the vehicle, of an area surrounding the vehicle, and identifying, using digital image analysis techniques, the merchant communication terminal within at least one of the images and a position of the merchant communication terminal relative to the vehicle.

The goods or services provided by the merchant may include at least one of: gasoline, food, dry cleaning, coffee, groceries, pharmaceuticals, or vehicle maintenance. The merchant may be at least one of: a gas station, a vehicle repair shop, a bank, a fast food or other restaurant, a grocery store, a pharmacy, a coffee shop, or a dry cleaners.

The vehicle may be an autonomous vehicle which automatically navigates to the merchant communication terminal and further navigates to a position relative to the merchant communication terminal for receiving the goods or services from the merchant.

The merchant may be a gas station and the user control for transmitting a request to order the goods or services may further transmit an authorization of payment from the virtual account associated with the vehicle.

The computer system may be further configured to generate a list of preferred merchants for the user that accept vehicle payments, wherein detecting a triggering event may include determining that the detected merchant communication terminal is for a merchant that is on the list of preferred merchants before communicating with the merchant communication terminal.

In yet another aspect, a non-transitory computer-readable medium may be provided. The non-transitory computer-readable medium may store a set of instructions, that when executed on one or more processors in a head unit of a vehicle, may cause the one or more processors to: (1) obtain identification information for a user within a vehicle or for the vehicle; (2) authenticate the user or the vehicle based upon the identification information to ensure the user or the vehicle is authorized to use a virtual account for purchasing goods or services; and/or (3) detect a triggering event indicating that the vehicle is within a predetermined range for communicating with a merchant communication terminal of a merchant. The set of instructions may further cause the one or more processors to: (4) present a display including an indication of goods or services that can be purchased at the merchant communication terminal and a user control for transmitting a request to order the goods or services to the merchant communication terminal; and/or in response to receiving a selection of the user control: (5) transmit the request to order the goods or services to the merchant communication terminal; and/or (6) securely transfer, via a short-range communication link, funds from the virtual account to a virtual account of the merchant to facilitate secure vehicle payment of goods and services. The non-transitory computer-readable medium may include additional, fewer, or alternate components and/or functionality, including that discussed elsewhere herein.

For instance, the identification information may include a PIN number, a facial scan, a finger print scan, a retina scan, a voice scan, an authenticated key fob, mobile device identification information, sensor data from weight or pressure sensors within the vehicle which detect a weight of a driver or passenger within the vehicle, or a license plate number for the vehicle.

To detect a triggering event, the set of instructions may further cause the one or more processors to at least one of: (1) detect that the vehicle is within Wi-Fi, Radio Frequency Identification (RFID), or Bluetooth communication range of the merchant communication terminal by receiving a Wi-Fi, RFID, or Bluetooth signal from the merchant communication terminal; (2) detect that the vehicle is within a predetermined distance of the merchant communication terminal by comparing a current location of the vehicle to the location of the merchant communication terminal; and/or (3) detect that the vehicle is within a predetermined distance of the merchant communication terminal by capturing images, via a camera within the vehicle, of an area surrounding the vehicle, and identifying, using digital image analysis techniques, the merchant communication terminal within at least one of the images and a position of the merchant communication terminal relative to the vehicle.

The goods or services provided by the merchant may include at least one of: gasoline, food, dry cleaning, coffee, groceries, pharmaceuticals, or vehicle maintenance. The merchant may be at least one of: a gas station, a vehicle repair shop, a bank, a fast food or other restaurant, a grocery store, a pharmacy, a coffee shop, or a dry cleaners.

The merchant may be a gas station and the user control for transmitting a request to order the goods or services may further transmit an authorization of payment from the virtual account associated with the vehicle.

The set on instructions may further cause the one or more processors to generate a list of preferred merchants for the user that accept vehicle payments, wherein detecting a triggering event may include determining that the detected merchant communication terminal is for a merchant that is on the list of preferred merchants before communicating with the merchant communication terminal.

X. Exemplary Autonomous Vehicle Embodiments

Figure 9:
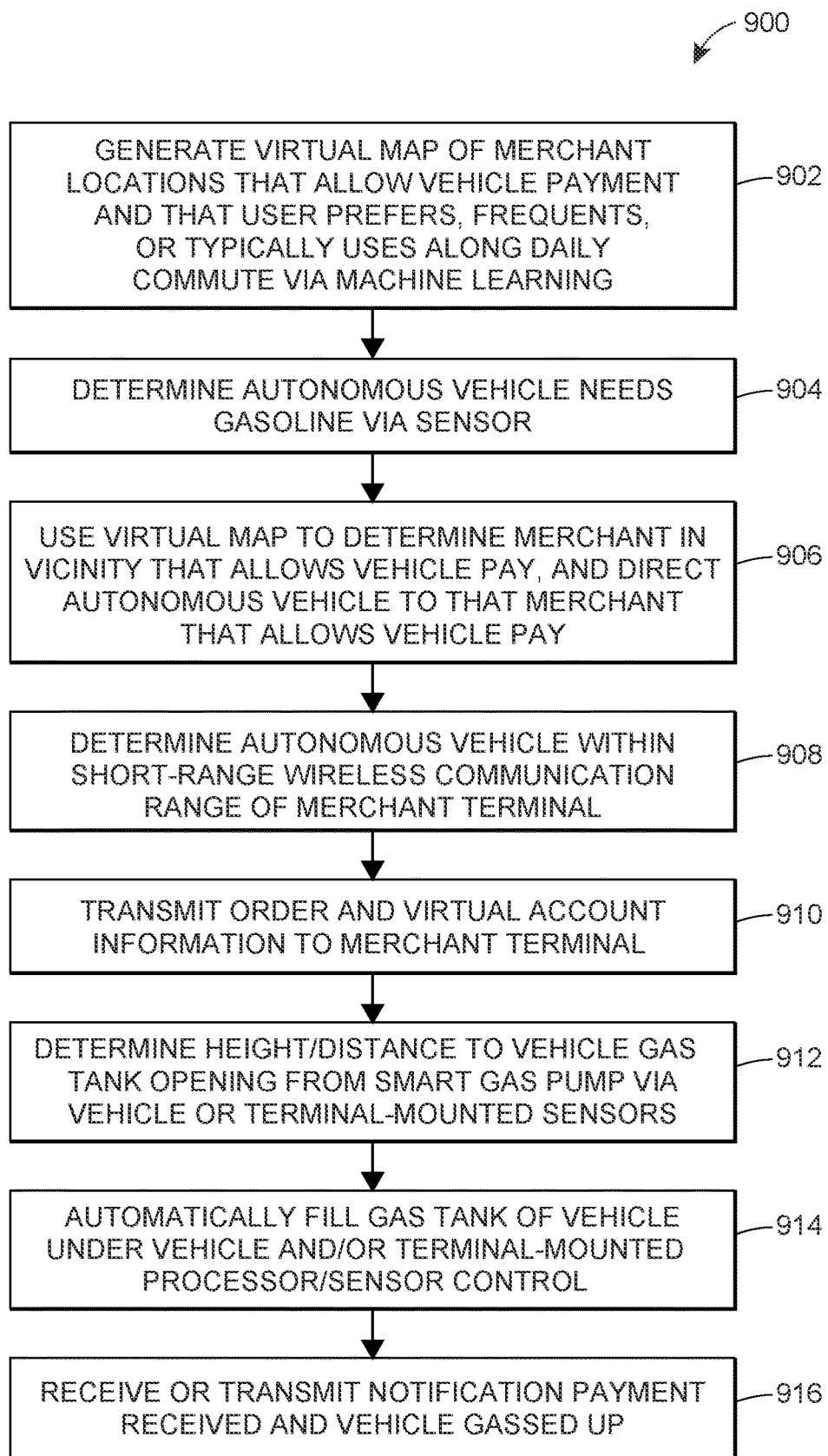
FIG. 9 depicts a flow diagram representing an exemplary method of re-fueling an autonomous vehicle and locating merchants that accept vehicle payments in accordance with an exemplary aspect of the present disclosure.

FIG. 9 depicts an exemplary computer-implemented method of re-fueling an autonomous vehicle and locating merchants that accept vehicle pay 900. The method 900 may include, via one or more vehicle-mounted or merchant communication terminal-mounted processors, sensors, and/or transceivers, generating a virtual map of merchant locations that allow vehicle payments and that the user prefers, frequents, or typically uses along their daily commute via machine learning 902; determining an autonomous vehicle needs gasoline via a gas tank gauge or sensor 904; using the virtual map to determine or locate a merchant in the vicinity of the autonomous vehicle (such as by using GPS locations of the merchants and the autonomous vehicle) that allows vehicle payments, and directing the autonomous vehicle to travel to that merchant that allows vehicle payment 906; determining or detecting that the autonomous vehicle is within short-range wireless communication range of a merchant smart wireless communication terminal 908; transmitting an order and virtual account information of the passenger or vehicle from the autonomous vehicle to be received at the merchant terminal via wireless communication or data transmission over the short-range communication channel or radio link 910; determining or detecting the height of, and/or distance to the vehicle gas tank opening from a smart gas pump or merchant terminal via one or more vehicle or terminal-mounted sensors 912; automatically filling the gas tank of the autonomous vehicle under autonomous vehicle or terminal-mounted processor and/or sensor control 914; and/or generating and transmitting an electronic notification that payment was received and that the vehicle gassing is completed at the communication terminal, or receiving such electronic notification at the autonomous vehicle 916. The method may include additional, less, or alternate actions, including those discussed elsewhere herein.

For instance, the method may include, via one or more vehicle-mounted or merchant communication terminal-mounted processors, sensors, and/or transceivers, generating a virtual map of merchant locations that allow vehicle payments and that the user prefers, frequents, or typically uses along their daily commute via machine learning 902. For instance, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, and/or GPS or location data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant personal or vehicle travel patterns, preferred travel patterns or routes, preferred or regularly used merchants or merchant chains, such as restaurant or gas station national or regional chains from mobile device sensors, vehicle-mounted sensors, vehicle telematics data, route information, GPS data, and/or other sensor data, image data, and/or other data.

In one embodiment, a processing element may be trained by providing it with a large sample of conventional analog and/or digital, still and/or moving (i.e., video) image data, telematics data, and/or other data of routes, maps, roads, typical routes, etc. with known characteristics or features. Based upon these analyses, the processing element may learn how to identify characteristics and patterns (including routes) that may then be applied to analyzing sensor data, vehicle telematics data, image data, mobile device data, GPS data, and/or other data. For example, the processing element may learn, with the customer's permission or affirmative consent, to identify the preferred routes of the driver or vehicle, the type of merchants (such as merchants providing goods such as gasoline and food) that the driver or vehicle typically uses, purchases, or prefers, and/or purchasing patterns of the customer, such as by analysis of virtual receipts, customer virtual accounts with online or physical retailers, mobile device data, interconnect vehicle data, etc. For the goods identified, a virtual inventory of merchant preferences for an individual or a family vehicle may be maintained current and up-to-date. As a result, autonomous vehicles may be routed to a preferred merchant, such as when a sensor indicates that the autonomous vehicle needs fuel, or when a passenger indicates that they would like certain goods or services, such as stopping at a preferred restaurant for food.

The method 900 may also include automatically filling the gas tank of the autonomous vehicle under autonomous vehicle or terminal-mounted processor and/or sensor control

914. For instance, after a merchant communication terminal (such as a smart gas pump) determines that the autonomous vehicle is in position and ready to receive gas, the merchant communication terminal may (1) move a robotic arm with a gas nozzle into position; (2) sense that a smart or other nozzle is in position, such as within a gas tank opening; (3) open a smart valve to allow gasoline to flow into the autonomous vehicle gas tank; (4) receive an indication from a sensor that the gas tank is almost full; (6) shut the smart valve to stop the flow of gasoline; and/or (7) retract the robotic arm.

In one aspect, a computer system for re-fueling an autonomous vehicle and locating merchants that accept vehicle pay may be provided. The computer system may include one or more autonomous vehicle-mounted or merchant communication terminal-mounted processors, sensors, and/or transceivers that are configured to: (1) generate a virtual map of merchant locations that allow vehicle payments and that the user prefers, frequents, or typically uses along their daily commute via machine learning; (2) determine that an autonomous vehicle needs gasoline via a gas tank gauge or sensor; (3) use the virtual map to determine or locate a merchant in the vicinity of the autonomous vehicle (such as by using GPS locations of the merchants and the autonomous vehicle) that allows vehicle payments, and directing the autonomous vehicle to travel to that merchant that allows vehicle payment; (4) determine or detect that the autonomous vehicle is within short-range wireless communication range of a merchant smart wireless communication terminal; (5) transmit an order and virtual account information of the passenger or vehicle from the autonomous vehicle to be received at the merchant terminal via wireless communication or data transmission over the short-range communication channel or radio link; (6) determine or detect the height of, and/or distance to the vehicle gas tank opening from a smart gas pump or merchant terminal via one or more vehicle or terminal-mounted sensors; (7) automatically fill the gas tank of the autonomous vehicle under autonomous vehicle or terminal-mounted processor and/or sensor control; and/or (8) generate and transmit an electronic notification that payment was received and that the vehicle gassing is completed at the communication terminal, or receiving such electronic notification at the autonomous vehicle to facilitate commercial transactions completed via autonomous vehicle payment.

In another aspect, a computer-implemented method of re-fueling an autonomous vehicle and locating merchants that accept vehicle pay may be provided. The method may include, via one or more autonomous vehicle-mounted processors, sensors, and/or transceivers: (1) generating a virtual map of merchant locations that allow vehicle payments and that the user prefers, frequents, or typically uses along their daily commute via machine learning; (2) determining that the autonomous vehicle needs gasoline (such as via a gas tank gauge or sensor); (3) using the virtual map to determine or locate a merchant in the vicinity of the autonomous vehicle (such as by using GPS locations of the merchants and the autonomous vehicle) that allows vehicle payments, and directing the autonomous vehicle to travel to that merchant that allows vehicle payment; (4) determining or detecting that the autonomous vehicle is within short-range wireless communication range of a merchant smart wireless communication terminal; (5) transmitting an order and virtual account information of the passenger or vehicle from the autonomous vehicle to be received at the merchant terminal via wireless communication or data transmission over the short-range communication channel or radio link; (6) transmitting the height off the ground of the vehicle gas tank opening to the merchant terminal via wireless communication or data transmission over the short-range communication channel or radio link; (7) opening a vehicle gas tank cover; (8) transmitting an indication that the vehicle gas tank cover is open (to allow filling of the gas tank by a smart gas pump) to the merchant terminal via wireless communication or data transmission over the short-range communication channel or radio link; (9) detecting that the gas tank is almost full; (10) transmitting an indication that the gas tank is almost full, and to stop fueling the vehicle, to the merchant terminal via wireless communication or data transmission over the short-range communication channel or radio link; and/or (11) receiving an electronic receipt for the gasoline pumped into the autonomous vehicle by the merchant terminal to facilitate commercial transactions using vehicle payment.

In another aspect, a computer system configured for re-fueling an autonomous vehicle and locating merchants that accept vehicle pay may be provided. The computer system may include autonomous vehicle-mounted processors, sensors, and/or transceivers that are configured to: (1) generate a virtual map of merchant locations that allow vehicle payments and that the user prefers, frequents, or typically uses along their daily commute via machine learning; (2) determine that the autonomous vehicle needs gasoline (such as via a gas tank gauge or sensor); (3) use the virtual map to determine or locate a merchant in the vicinity of the autonomous vehicle (such as by using GPS locations of the merchants and the autonomous vehicle) that allows vehicle payments, and directing the autonomous vehicle to travel to that merchant that allows vehicle payment; (4) determine or detect that the autonomous vehicle is within short-range wireless communication range of a merchant smart wireless communication terminal; (5) transmit an order and virtual account information of the passenger or vehicle from the autonomous vehicle to be received at the merchant terminal via wireless communication or data transmission over the short-range communication channel or radio link; (6) transmit the height off the ground of the vehicle gas tank opening to the merchant terminal via wireless communication or data transmission over the short-range communication channel or radio link; (7) open a vehicle gas tank cover; (8) transmit an indication that the vehicle gas tank cover is open (to allow filling of the gas tank by a smart gas pump/merchant terminal) to the merchant terminal via wireless communication or data transmission over the short-range communication channel or radio link; (9) detect that the gas tank is almost full; (10) transmit an indication that the gas tank is almost full, and to stop fueling the vehicle, to the merchant terminal via wireless communication or data transmission over the short-range communication channel or radio link; and/or (11) receive an electronic receipt for the gasoline pumped into the autonomous vehicle by the merchant terminal to facilitate commercial transactions using vehicle payment.

In yet another aspect, a computer-implemented method of using an autonomous vehicle as an electronic payment device may be provided. The method may include: (1) generating (via one or more processors in an autonomous vehicle) a virtual map display of a geographic area including indications of merchant locations that accept vehicle payments, wherein the merchant locations are preferred locations for a user as indicated by user preferences; (2) determining (via the one or more processors via a fuel level sensor) that an amount of gasoline in the autonomous vehicle is less than a threshold amount of gasoline; (3)

selecting (via the one or more processors) one of the merchant locations included in the virtual map display which provides gasoline and accepts virtual payments; and/or (4) generating and providing (via the one or more processors) navigation directions for the autonomous vehicle to navigate to the selected merchant location. Upon arriving at the selected merchant location, the method may further include: (4) transmitting (via the one or more processors and/or associated transceivers, and/or a wired or wireless communication and/or data transmission) to a merchant communication terminal at the merchant location, a request to purchase gasoline including authorizing payment for the gasoline; upon detecting, via the fuel level sensor, that a gas tank of the autonomous vehicle is full, (5) transmitting (via the one or more processors and/or associated transceivers, and/or a wired or wireless communication and/or data transmission) a request to stop fueling the vehicle; and/or (6) receiving (via the one or more processors and/or associated transceivers, and/or a wired or wireless communication and/or data transmission) an electronic receipt for the gasoline pumped into the autonomous vehicle by the merchant communication terminal to facilitate commercial transactions using vehicle payments.

The foregoing methods may include additional, less, or alternate actions, including those discussed elsewhere herein. The foregoing methods may be implemented via one or more local or remote processors, sensors, and/or transceivers, and/or via computer-executable instructions stored on non-transitory computer-readable medium or media.

For instance, the merchant location may include a smart gas pump that automatically provides gasoline to the autonomous vehicle; and/or in response to receiving the indication that the gas tank cover is open, the merchant communication terminal may cause the smart gas pump to provide gasoline to the autonomous vehicle. The smart gas pump may automatically provide gasoline to the autonomous vehicle by extending a mechanical arm attached to a nozzle into the gas tank opening of the autonomous vehicle.

The method may include opening (via the one or more processors) a gas tank cover for the autonomous vehicle; and/or providing (via the one or more processors) an indication to the merchant communication terminal that the gas tank cover is open and an indication of a position of a gas tank opening for the autonomous vehicle.

Figure 10:
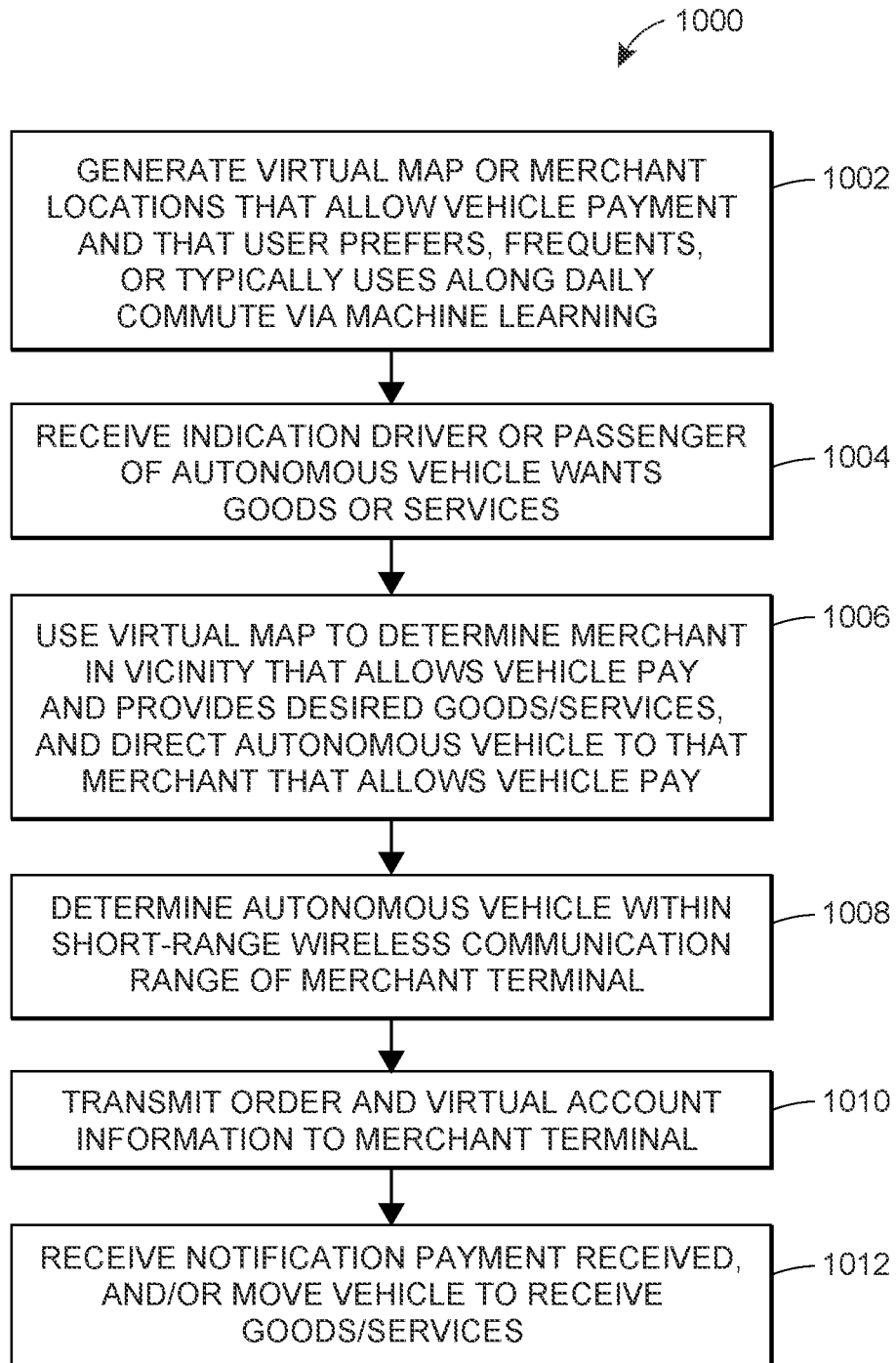
FIG. 10 depicts a flow diagram representing an exemplary method of receiving goods or services via an autonomous vehicle and locating merchants that accept vehicle payments in accordance with an exemplary aspect of the present disclosure.

FIG. 10 depicts another exemplary computer-implemented method of receiving goods or services via an autonomous vehicle and locating merchants that accept vehicle pay 1000. The method may include, via one or more vehicle-mounted or merchant communication terminal-mounted processors, sensors, and/or transceivers, generating a virtual map of merchant locations that allow vehicle payments and that the user prefers, frequents, or typically uses along their daily commute via machine learning 1002; receiving an indication that the driver or passenger of the autonomous vehicle wants to receive a certain type of goods or services 1004; using the virtual map to determine or locate a merchant in the vicinity of the autonomous vehicle (such as by using GPS locations of the merchants and the autonomous vehicle) that allows vehicle payments, and directing the autonomous vehicle to travel to that merchant that allows vehicle payment 1006; determining or detecting that the autonomous vehicle is within short-range wireless communication range of a merchant smart wireless communication terminal 1008; transmitting an order and virtual account information of the passenger or vehicle from the autonomous vehicle to be received at the merchant terminal via wireless communication or data transmission over the short-range communication channel or radio link 1010; and/or generating and transmitting an electronic notification that payment was received and that the vehicle gassing is completed at the communication terminal, or receiving such electronic notification at the autonomous vehicle 1012. The method may include additional, less, or alternate actions, including those discussed elsewhere herein.

In another aspect, a computer system configured to receive goods or services via an autonomous vehicle and locate merchants that accept vehicle pay, the computer system may include one or more vehicle-mounted or merchant communication terminal-mounted processors, sensors, and/or transceivers that are configured to: (1) generate a virtual map of merchant locations that allow vehicle payments and that the user prefers, frequents, or typically uses along their daily commute via machine learning; (2) receive an indication that the driver or passenger of the autonomous vehicle wants to receive a certain type of goods or services; (3) use the virtual map to determine or locate a merchant in the vicinity of the autonomous vehicle (such as by using GPS locations of the merchants and the autonomous vehicle) that allows vehicle payments, and directing the autonomous vehicle to travel to that merchant that allows vehicle payment; (4) determine or detect that the autonomous vehicle is within short-range wireless communication range of a merchant smart wireless communication terminal; (5) transmit an order and virtual account information of the passenger or vehicle from the autonomous vehicle to be received at the merchant terminal via wireless communication or data transmission over the short-range communication channel or radio link; and/or (6) generate and transmit an electronic notification that payment was received and that the vehicle gassing is completed at the communication terminal, or receiving such electronic notification at the autonomous vehicle to facilitate commercial transactions via vehicle payment.

In another aspect, a computer-implemented method of receiving goods or services via an autonomous vehicle and locating merchants that accept vehicle pay may be provided. The method may include one or more autonomous vehicle-mounted processors, sensors, and/or transceivers: (1) generating a virtual map of merchant locations that allow vehicle payments and that the user prefers, frequents, or typically uses along their daily commute via machine learning; (2) receiving an indication that the driver or passenger of the autonomous vehicle wants to receive a certain type of goods or services; (3) using the virtual map to determine or locate a merchant in the vicinity of the autonomous vehicle (such as by using GPS locations of the merchants and the autonomous vehicle) that allows vehicle payments, and directing the autonomous vehicle to travel to that merchant that allows vehicle payment; (4) determining or detecting that the autonomous vehicle is within short-range wireless communication range of a merchant smart wireless communication terminal; (5) transmitting an order and virtual account information of the passenger or vehicle from the autonomous vehicle to be received at the merchant terminal via wireless communication or data transmission over the short-range communication channel or radio link; and/or (6) receiving an electronic notification that payment was received and that the vehicle gassing is completed at the autonomous vehicle to facilitate commercial transactions via vehicle payment.

In another aspect, a computer system configured to receive goods or services via an autonomous vehicle and locate merchants that accept vehicle pay may be provided. The computer system may include one or more autonomous vehicle-mounted processors, sensors, and/or transceivers that are configured to: (1) generate a virtual map of merchant locations that allow vehicle payments and that the user prefers, frequents, or typically uses along their daily commute via machine learning; (2) receive an indication that the driver or passenger of the autonomous vehicle wants to receive a certain type of goods or services; (3) use the virtual map to determine or locate a merchant in the vicinity of the autonomous vehicle (such as by using GPS locations of the merchants and the autonomous vehicle) that allows vehicle payments, and directing the autonomous vehicle to travel to that merchant that allows vehicle payment; (4) determine or detect that the autonomous vehicle is within short-range wireless communication range of a merchant smart wireless communication terminal; (5) transmit an order and virtual account information of the passenger or vehicle from the autonomous vehicle to be received at the merchant terminal via wireless communication or data transmission over the short-range communication channel or radio link; and/or (6) receive an electronic notification that payment was received and that the vehicle gassing is completed at the autonomous vehicle to facilitate commercial transactions via vehicle payment.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

XI. Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. The patent claims at the end of this patent application are not intended to be construed under 35 U.S.C. § 112(f) unless traditional means-plus-function language is expressly recited, such as "means for" or "step for" language being explicitly recited in the claim(s).

Accordingly, the term "vehicle" may refer to any of a number of motorized transportation devices. A vehicle may be a car, truck, bus, train, boat, plane, motorcycle, snowmobile, other personal transport devices, etc.

As used herein, the terms "financial card," "financial account," and "virtual account" may be used to refer to any device or identifier that enables the cardholder to make a payment via an electronic transfer of funds. For example, a financial card, financial account, or virtual account may include a credit card, a debit card, a gift card, a charge card, a stored-value card, a rewards card, a bank account, a rewards account, a pre-paid toll account, etc.

The term "point-of-sale (POS) terminal" as used herein may refer to an electronic device used to process financial card payments at retail locations. For example, a POS terminal may include a computer, a cash register and/or other equipment or software for reading financial data, recording transactions, and/or communicating with a credit card network to transfer funds.

As used herein, the term "establishment" may be used to refer to a merchant and/or retail location for selling goods or services to customers. For example, an establishment may include a restaurant, a gas station, a car wash, a clothing store, a department store, a furniture store, a grocery store, a convenience store, a dry cleaning store, a pharmacy, a vehicle repair shop, etc.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One may be implement numerous alternate embodiments, using either current technology or technology developed after the filing date of this application.

We claim:

1. A computer-implemented method for using a vehicle as a payment device, the method executed by one or more processors programmed to perform the method, the method comprising:

receiving, by one or more processors executing a vehicle payment application, one or more sets of financial data each corresponding to a financial account for making payments;

generating, by the one or more processors executing the vehicle payment application, a virtual map display of a geographic area including indications of merchant locations that accept vehicle payments;

receiving, by the one or more processors executing the vehicle payment application, a selection of one of the merchant locations;

receiving, by the one or more processors executing the vehicle payment application, a selection by the user of one of the one or more financial accounts for initiating a payment process at the selected merchant location, and authenticating the user to ensure the user is authorized to use the selected financial account, wherein authenticating the user includes:

receiving, by the one or more processors executing the vehicle payment application, biometric information from the user including a facial scan; and comparing, by the one or more processors executing the vehicle payment application, the biometric information to stored biometric information for an authorized user;

transmitting, by the one or more processors executing the vehicle payment application, a request to purchase fuel to a merchant communication terminal or server associated with the selected merchant location, the request including an indication of the selected financial account; and causing a fuel pump at the selected merchant location to activate and open a valve to provide fuel to the vehicle by transmitting the indication of the selected financial account to the merchant communication terminal or server.

2. The computer-implemented method of claim 1, further comprising:

for each of the one or more sets of financial data, obtaining, by the one or more processors executing the vehicle payment application, a token representing the set of financial data; and transmitting, by the one or more processors executing the vehicle payment application, the token corresponding to the selected financial account to the merchant communication terminal or server.

3. The computer-implemented method of claim 1, wherein authenticating the user includes:

receiving, by the one or more processors executing the vehicle payment application, login information or mobile device identification information; and comparing, by the one or more processors, the login information or the mobile device identification information to a stored unique identifier for an authorized user.

4. The computer-implemented method of claim 1, further comprising:

detecting, by the one or more processors, a triggering event indicating that the vehicle is within a predetermined range for communicating with the merchant communication terminal; and transmitting, by the one or more processors, the request to purchase the fuel to the merchant communication terminal in response to detecting the triggering event.

5. The computer-implemented method of claim 4, wherein detecting the triggering event includes at least one of:

detecting, by the one or more processors, that the vehicle is within Wi-Fi, Radio Frequency Identification (RFID), or Bluetooth communication range of the merchant communication terminal by receiving a Wi-Fi, RFID, or Bluetooth signal from the merchant communication terminal;

detecting, by the one or more processors, that the vehicle is within a predetermined distance of the merchant communication terminal by comparing a current location of the vehicle to the selected merchant location; or detecting, by the one or more processors, that the vehicle is within a predetermined distance of the merchant communication terminal by capturing images, via a camera within the vehicle, of an area surrounding the vehicle, and identifying, using digital image analysis techniques, the merchant communication terminal within at least one of the images and a position of the merchant communication terminal relative to the vehicle.

6. The computer-implemented method of claim 4, wherein the merchant communication terminal is a point of sale (POS) terminal at a fuel station.

7. The computer-implemented method of claim 1, wherein transmitting the request to purchase fuel to the merchant communication terminal includes transmitting the request via a short-range communication link.

8. The computer-implemented method of claim 1, wherein the vehicle payment application is executed within a head unit of the vehicle.

9. A computer system configured to use a connected vehicle as an electronic payment device, the computer system comprising one or more processors, transceivers, and/or sensors configured to:

receive, by a vehicle payment application, one or more sets of financial data each corresponding to a financial account for making payments;

generate, by the vehicle payment application, a virtual map display of a geographic area including indications of merchant locations that accept vehicle payments;

receive, by the vehicle payment application, a selection of one of the merchant locations;

receive, by the vehicle payment application, a selection by the user of one of the one or more financial accounts for initiating a payment process at the selected merchant location, and authenticating the user to ensure the user is authorized to use the selected financial account, wherein authenticating the user includes:

receiving, by the vehicle payment application, biometric information from the user including a facial scan; and comparing, by the vehicle payment application, the biometric information to stored biometric information for an authorized user;

transmit, by the vehicle payment application, a request to purchase fuel to a merchant communication terminal or server associated with the selected merchant location, the request including an indication of the selected financial account; and cause a fuel pump at the selected merchant location to activate and open a valve to provide fuel to the vehicle by transmitting the indication of the selected financial account to the merchant communication terminal or server.

10. The computer system of claim 9, wherein the computer system is further configured to:
- for each of the one or more sets of financial data, obtain, by the vehicle payment application, a token representing the set of financial data; and
- transmit, by the vehicle payment application, the token corresponding to the selected financial account to the merchant communication terminal or server.

11. The computer system of claim 9, wherein to authenticate the user, the computer system is configured to:
- receive, by the vehicle payment application, login information or mobile device identification information; and
- compare the login information or the mobile device identification information to a stored unique identifier for an authorized user.

12. The computer system of claim 9, wherein to authenticate the user, the one or more processors are configured to:
- receive, by the vehicle payment application, login information or mobile device identification information; and
- compare the login information or the mobile device identification information to a stored unique identifier for an authorized user.

13. A non-transitory computer-readable medium storing thereon a set of instructions that, when executed on one or more processors, causes the one or more processors to:
- receive, by a vehicle payment application, one or more sets of financial data each corresponding to a financial account for making payments;
- generate, by the vehicle payment application, a virtual map display of a geographic area including indications of merchant locations that accept vehicle payments;
- receive, by the vehicle payment application, a selection of one of the merchant locations;
- receive, by the vehicle payment application, a selection by the user of one of the one or more financial accounts for initiating a payment process at the selected merchant location, and authenticating the user to ensure the user is authorized to use the selected financial account, wherein authenticating the user includes:
  - receiving, by the vehicle payment application, biometric information from the user including a facial scan; and
  - comparing, by the vehicle payment application, the biometric information to stored biometric information for an authorized user;
- transmit, by the vehicle payment application, a request to purchase fuel to a merchant communication terminal or server associated with the selected merchant location, the request including an indication of the selected financial account; and
- cause a fuel pump at the selected merchant location to activate and open a valve to provide fuel to the vehicle by transmitting the indication of the selected financial account to the merchant communication terminal or server.

14. The computer-readable medium of claim 13, wherein the one or more processors are further configured to:
- for each of the one or more sets of financial data, obtain, by the vehicle payment application, a token representing the set of financial data; and
- transmit, by the vehicle payment application, the token corresponding to the selected financial account to the merchant communication terminal or server.

* * * * *